(12) United States Patent
Zhang et al.

(10) Patent No.: US 12,327,345 B2
(45) Date of Patent: Jun. 10, 2025

(54) VISION-BASED SAFETY MONITORING AND/OR ACTIVITY ANALYSIS

(71) Applicant: Baidu USA, LLC, Sunnyvale, CA (US)

(72) Inventors: Sibo Zhang, Sunnyvale, CA (US); Liangjun Zhang, Cupertino, CA (US)

(73) Assignee: Baidu USA LLC, Sunnyvale, CA (US)

(*) Notice: Subject to any disclaimer, the term of this patent is extended or adjusted under 35 U.S.C. 154(b) by 489 days.

(21) Appl. No.: 17/874,135

(22) Filed: Jul. 26, 2022

(65) Prior Publication Data
US 2023/0072434 A1    Mar. 9, 2023

Related U.S. Application Data

(60) Provisional application No. 63/233,146, filed on Aug. 13, 2021.

(51) Int. Cl.
*G06V 20/52*    (2022.01)
*G06T 7/00*    (2017.01)
(Continued)

(52) U.S. Cl.
CPC ............. *G06T 7/0004* (2013.01); *G06T 7/11* (2017.01); *G06T 7/73* (2017.01); *G06V 10/225* (2022.01);
(Continued)

(58) Field of Classification Search
None
See application file for complete search history.

(56) References Cited

U.S. PATENT DOCUMENTS

| 2019/0287407 A1* | 9/2019 | Branscombe | G08G 1/161 |
| 2021/0034865 A1* | 2/2021 | Nord | G06F 18/254 |

(Continued)

FOREIGN PATENT DOCUMENTS

| CN | 110602449 A | * | 12/2019 | |
| CN | 110769195 A | * | 2/2020 | G06K 9/00771 |
| WO | WO-2019152177 A2 | * | 8/2019 | G06K 9/00771 |

OTHER PUBLICATIONS

Chen, C., Zhu, Z., & Hammad, A. (2020). Automated excavators activity recognition and productivity analysis from construction site surveillance videos. Automation in Construction, 110, 103045-. https://doi.org/10.1016/j.autcon.2019.103045 (Year: 2020).*

(Continued)

*Primary Examiner* — Amandeep Saini
*Assistant Examiner* — Caroline Tabancay Duffy
(74) *Attorney, Agent, or Firm* — Oppedahl Patent Law Firm LLC

(57) ABSTRACT

Presented herein are embodiments of a vision-based object perception system for activity analysis, safety monitoring, or both. Embodiments of the perception subsystem detect multi-class objects (e.g., construction machines and humans) in real-time while estimating the poses and actions of the detected objects. Safety monitoring embodiments and object activity analysis embodiments may be based on the perception result. To evaluate the performance of embodiments, a dataset was collected including multi-class of objects in different lighting conditions with human annotations. Experimental results show that the proposed action recognition approach outperforms the state-of-the-art approaches on top-1 accuracy by about 5.18%.

20 Claims, 25 Drawing Sheets

(51) Int. Cl.

| | | |
|---|---|---|
| *G06T 7/11* | (2017.01) | |
| *G06T 7/73* | (2017.01) | |
| *G06V 10/22* | (2022.01) | |
| *G06V 10/764* | (2022.01) | |
| *G06V 10/82* | (2022.01) | |
| *G08B 21/02* | (2006.01) | |

(52) U.S. Cl.
CPC ............ *G06V 10/764* (2022.01); *G06V 10/82* (2022.01); *G06V 20/52* (2022.01); *G08B 21/02* (2013.01); *G06T 2207/20021* (2013.01); *G06T 2207/20084* (2013.01); *G06T 2207/20132* (2013.01); *G06T 2207/30108* (2013.01)

(56) References Cited

U.S. PATENT DOCUMENTS

2021/0402942 A1* 12/2021 Torabi ............... G06N 3/02
2022/0024485 A1* 1/2022 Theverapperuma ... G06V 20/58

OTHER PUBLICATIONS

Nakamura, H., Tsukada, Y., Tamaki, T., Raytchev, B., Kaneda, K., Lau, P. Y., & Shobri, M. (2020). Pose estimation of excavators. 11515, 115152J-115152J-6. https://doi.org/10.1117/12.2566436 (Year: 2020).*

Roberts, D., & Golparvar-Fard, M. (2019). End-to-end vision-based detection, tracking and activity analysis of earthmoving equipment filmed at ground level. Automation in Construction, 105, 102811-. https://doi.org/10.1016/j.autcon.2019.04.006 (Year: 2019).*

Collins Dictionaries, editor. "Rule." Collins English Dictionary, 12th ed., Collins, 2014. Credo Reference, https://search.credoreference.com/articles/Qm9va0FydGljbGU6MzY0NTc2Nw==?aid279753. (Year: 2014).*

Wang, M., Wong, P., Luo, H., Kumar, S., Delhi, V., & Cheng, J. (2019). Predicting Safety Hazards Among Construction Workers and Equipment Using Computer Vision and Deep Learning Techniques. ISARC. Proceedings of the International Symposium on Automation and Robotics in Construction, 36, 399-406. (Year: 2019).*

Zhang et al.,"An autonomous excavator system for material loading tasks," Science Robotics, 6(55), 2021. [Abstract] (1 pg) [online], [Retrieved Feb. 7, 2024]. Retrieved from Internet <URL: https://www.science.org/doi/10.1126/scirobotics.abc3164>.

Wang et al.,"Predicting safety hazards among construction workers and equipment using computer vision and deep learning techniques," In 36th International Symposium on Automation and Robotics in Construction (ISARC), 2019. (8pgs).

Ren et al.,"Faster R-CNN: Towards Real-Time Object Detection with Region Proposal Networks," arXiv preprint arXiv:1506.01497, 2016. (14pgs).

Raoofia et al.,"Mask R-CNN Deep Learning-based approach to detect construction machinery on jobsites," In: 37th International Symposium on Automation and Robotics in Construction (ISARC), 2020. (6pgs).

Nakamura et al.,"Pose estimation of excavators," In International Workshop on Advanced Imaging Technology (IWAIT) 2020. [Abstract] (1 pg) [online], [Retrieved Feb. 8, 2024]. Retrieved from Internet <URL: https://www.spiedigitallibrary.org/conference-proceedings-of-spie/11515/2566436/Pose-estimation-of-excavators/10.1117/12.2566436.short>.

Soltani et al.,"Skeleton estimation of excavator by detecting its parts," Automation in Construction, 82:1-15, 2017. [Abstract] (6pgs).

Feichtenhofer et al.,"SlowFast Networks for Video Recognition," arXiv preprint arXiv:1812.03982, 2019. (10pgs).

Bertasius et al.,"Is space-time attention all you need for video understanding?" arXiv preprint arXiv:2102.05095, 2021. (13pgs).

Ding et al.,"A deep hybrid learning model to detect unsafe behavior: Integrating convolution neural networks and long short-term memory," Automation in construction, 86:118-124, 2018. [Abstract] (5pgs).

Chen et al.,"Automated excavators activity recognition and productivity analysis from construction site surveillance videos," Automation in construction, 110:103045, 2020. [Abstract] (5pgs).

Roberts et al.,"End-to-end vision-based detection, tracking and activity analysis of earthmoving equipment filmed at ground level," Automation in Construction, 105:102811, 2019. [Abstract] (7pgs).

Bodla et al.,"Soft-nms-improving object detection with one line of code," In Proceedings of the IEEE international conference on computer vision, 2017.(9 pgs).

Xiao et al.,"Simple baselines for human pose estimation and tracking," In Proceedings of the European conference on computer vision (ECCV), 2018. (16 pgs).

He et al.,"Deep residual learning for image recognition," In Proceedings of the IEEE conference on computer vision and pattern recognition, 2016. (9pgs).

Lin et al.,"Microsoft coco: Common objects in context," arXiv preprint arXiv: 1405.0312, 2015. (15pgs).

Redmon et al.,"Yolov3: An Incremental Improvement," arXiv preprint arXiv:1804.02767, 2018. (6pgs).

Chen et al.,"MMDetection: Open MMLab Detection Toolbox and Benchmark," arXiv preprint arXiv:1906.07155, 2019. (13pgs).

MMSegmentation Contributors, "MMSegmentation: Openmmlab semantic segmentation toolbox and benchmark," [online], [Retrieved Feb. 15, 2024]. Retrieved from Internet <URL: https://github.com/open-mmlab/mmsegmentation> 2020. (1pg).

MMPose Contributors, "Openmmlab pose estimation toolbox and benchmark," [online], [Retrieved Feb. 15, 2024]. Retrieved from Internet <URL: https://github.com/open-mmlab/mmpose> 2020. (1pg).

MMAction2 Contributors, "Openmmlab's next generation video understanding toolbox and benchmark," [online], [Retrieved Feb. 15, 2024]. Retrieved from Internet <URL: https://github.com/open-mmlab/mmaction2> 2020. (1pg).

Bolda et al.,"Improving Object DetectionWith One Line of Code," arXiv preprint arXiv:1704.04503, 2017. (9pgs).

Xiao et al.,"Simple Baselines for Human Pose Estimation and Tracking," arXiv preprint arXiv:1804.06208, 2018. (16pgs).

Bochkovskiy et al.,"YOLOv4: Optimal Speed and Accuracy of Object Detection," arXiv preprint arXiv:2004.10934, 2020. (17pgs).

Jocher et al.,"ultralytics/yolov5: v3.1—Bug Fixes and Performance Improvements," 2020. [online], [Retrieved Feb. 16, 2024]. Retrieved from Internet <URL: https://zenodo.org/records/4154370> (1pg).

Wang et al.,"CSPNet: A New Backbone that can Enhance Learning Capability of CNN," In: Proceedings of the IEEE/CVF Conference on Computer Vision and Pattern Recognition Workshops, 2020. (10 pgs).

Redmon et al.,"You Only Look Once: Unified, Real-Time Object Detection," In Proceedings of the IEEE Conference on Computer Vision & Pattern Recognition, 2016. (10pgs).

\* cited by examiner

VISION-BASED SAFETY MONITORING AND/OR ACTIVITY ANALYSIS

CROSS-REFERENCE TO RELATED APPLICATION(S)

This patent application is related to and claims priority benefit under 35 USC § 119 to and commonly-owned U.S. Pat. App. No. 63/233,146, filed on 13 Aug. 2021, entitled "VISION-BASED EQUIPMENT ACTIVITY ANALYSIS AND SAFETY MONITORING," and listing Sibo Zhang and Liangjun Zhang as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for vision-based safety monitoring and object activity analysis.

B. Background

The last several years has witnessed a dramatic increase in research and development related to autonomous vehicles. Autonomous vehicles have been investigated for a number of purposes including autonomous car, autonomous truck, autonomous robots, autonomous drones, and autonomous construction vehicles. The rationale for researching and developing autonomous vehicles varies depending upon the application. For example, self-driving cars aid commuters and drivers. Self-driving trucks reduces the costs associated with transporting goods. Autonomous heavy equipment is useful for both reducing costs and reducing the need for humans to work in dangerous situations.

Operating vehicles, like excavators, in a real-world environment can be challenging due to extreme conditions. The complexity of operating heavy equipment combined with dangerous environments have resulted in multiple fatalities and injuries occurring each year. Safety is one of the main requirements on construction sites. With the advance of deep learning and computer vision technology, autonomous vehicle systems have been investigated and have solid progress. However, systems and methods for safely operating heavy equipment and monitoring its performance still fail to capture the complexity of these tasks.

Accordingly, what is needed are systems and methods for object detection (e.g., equipment such as autonomous vehicle, humans, etc.) monitoring and analysis.

SUMMARY

Presented herein are systems, methods, and computer-readable media comprising instructions for embodiments for vision-based object perception for activity analysis, for safety monitoring, or for both activity analysis and safety monitoring. Embodiments of the perception system are able to detect multi-class objects (e.g., construction machines and humans) in real-time while estimating the poses and actions. Also presented are embodiments of novel safety monitoring and object activity analysis subsystems based on the perception result. To evaluate the performance of some embodiments, a dataset was collected using an Autonomous Excavator System (AES) including multi-class of objects in different lighting conditions with humans. Results of evaluations of embodiments showed objects detection model improved inference speed and accuracy, while model size was reduced. While an excavator was used by way of illustration, embodiments of the real-time safety monitoring system and the real-time activity/productivity analysis system is not only limited to that equipment or to that environment (e.g., solid waste scenes). Embodiments may be applied to other scenarios.

In one or more embodiments, a system for analyzing a working area may comprise one or more processors, and a non-transitory computer-readable medium or media comprising one or more sets of instructions which, when executed by at least one of the one or more processors, causes steps to be performed. In one or more embodiments, the steps may comprise: segmenting the working area into one or more defined regions using a working area segmentation neural network subsystem that receives image data from at least one camera and segments the working area into one or more defined sub-areas; detecting one or more objects in the working area using image data from at least one camera and an object detection neural network subsystem that receives the image data to produce, for each detected object from a set of one or more detected objects in the image data, a classification of the detected object and a bounding region data for the detected object; and using a safety monitor subsystem to detect a safety issue, which may be detected in real-time. In one or more embodiments, the safety monitoring subsystem may receive the one or more defined sub-areas of the working area from the working area segmentation neural network subsystem and, for each detected object from a set of one or more detected objects, its bounding region data from the object detection neural network subsystem, determine, based upon one or more models, the one or more defined sub-areas of the working area, and the bounding region data from the object detection neural network subsystem, whether a safety issue exists, and responsive to a safety issue existing, causes an alert to be made.

It shall be noted that detected objects may be equipment (which may be autonomous) and may be other objects, such as humans.

In one or more embodiments, the system may, for a detected equipment, identify a set of one or more action states of the equipment using an action recognition subsystem that, based upon image data from at least one of one or more cameras, uses one or more models to identify the set of one or more action states of the equipment during a duration of the image data. In one or more embodiments, the action recognition subsystem may comprise a rules-based model(s), deep-learning-based model(s), or both.

In one or more embodiments that includes an action recognition subsystem, the safety monitor subsystem may be further configured to receive the set of one or more action states and use one or more models to detect a safety issue by detecting a non-normal action state or a non-normal sequence of action states.

In one or more embodiments, the system may use the bounding region data of a detected object and the corresponding image data to generate a set of cropped images of the detected object, and use the set of cropped images of the detected object in an action neural network model to identify one or more action states of the detected object across the set of cropped images.

In one or more embodiments, the action recognition subsystem may comprise a set of rules that identifies one or more action states of the detected object using a set of keypoints of the detected object across a set of images from the image data, in which the set of keypoints are obtained from a pose estimation subsystem that uses the bounding region data of the detected object and the image data from the object detection neural network subsystem to identify keypoints of the detected object across the set of images.

In one or more embodiments, a productivity analysis subsystem may receive, for a detected object, the one or more of the action states from the action recognition subsystem and may determine productivity for the detected object based upon a set of parameters comprising one or more object-related parameters.

In one or more embodiments, the system may refine the bounding region data using a set of keypoints for a detected object, in which the set of keypoints for the detected object is obtained from a pose estimation subsystem that uses the bounding region data of the detected object and image data from the object detection neural network subsystem to identify the set of keypoints. And, in one or more embodiments, the safety monitor subsystem may use a refined bounding region data as the bounding region data for a detected object when ascertaining safety issues.

In one or more embodiments, the safety monitor subsystem may determine a safety issue by performing at least one of the steps comprising: using the bounding region data of a first detected object and the bounding region data of a second detected object to monitor for safety by determining if the bounding region data of the first detected object is within a threshold of the bounding region data of the second detected object; using the bounding region data of the first detected object and at least one of the one or more defined sub-areas to monitor for safety by determining if a threshold portion of the bounding region data of the first detected object is within one of the defined sub-areas; using the bounding region data of the first detected object, the bounding region data of the second detected object, and at least one of the one or more defined sub-areas to monitor for safety by determining if a first threshold portion of the bounding region data of the first detected object and a second threshold portion of the bounding region data of the second detected object are within a same defined sub-area; and/or using at least some of the set of keypoints for the detected object to determine a safety issue responsive to detecting a non-normal key point orientation.

In one or more embodiments, a system for analyzing a working area may comprise one or more processors, and a non-transitory computer-readable medium or media comprising one or more sets of instructions which, when executed by at least one of the one or more processors, causes steps to be performed. In one or more embodiments, the steps may comprise: segmenting the working area into one or more defined regions using a working area segmentation neural network subsystem that receives image data from at least one camera and segments the working area into one or more defined sub-areas; detecting one or more objects in the working area using image data from at least one camera and an object detection neural network subsystem that receives the image data to produce, for each detected object from a set of one or more detected objects in the image data, a classification of the detected object and a bounding region data for the detected object; for a detected object, identifying a set of one or more action states of the detected object using an action recognition subsystem that, based upon image data from at least one camera, uses one or more models to identify the set of one or more action states of the equipment during a duration of the image data; and using a productivity analysis subsystem that receives, for the detected object, the one or more of the action states from the action recognition subsystem and determines productivity for the detected object based upon a set of parameters comprising one or more object-related parameters.

It shall be noted that embodiments may be implemented as systems, computer-implemented methods, or instructions encoded on a non-transitory computer-readable medium or media which, when executed by at least one of the one or more processors, causes the methods to be performed.

Some features and advantages of embodiments of the present invention have been generally described in this summary section; however, additional features, advantages, and embodiments are presented herein or will be apparent to one of ordinary skill in the art in view of the figures, specification, and claims hereof. Accordingly, it should be understood that the scope of the present invention shall not be limited by the particular embodiments disclosed in this summary section.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
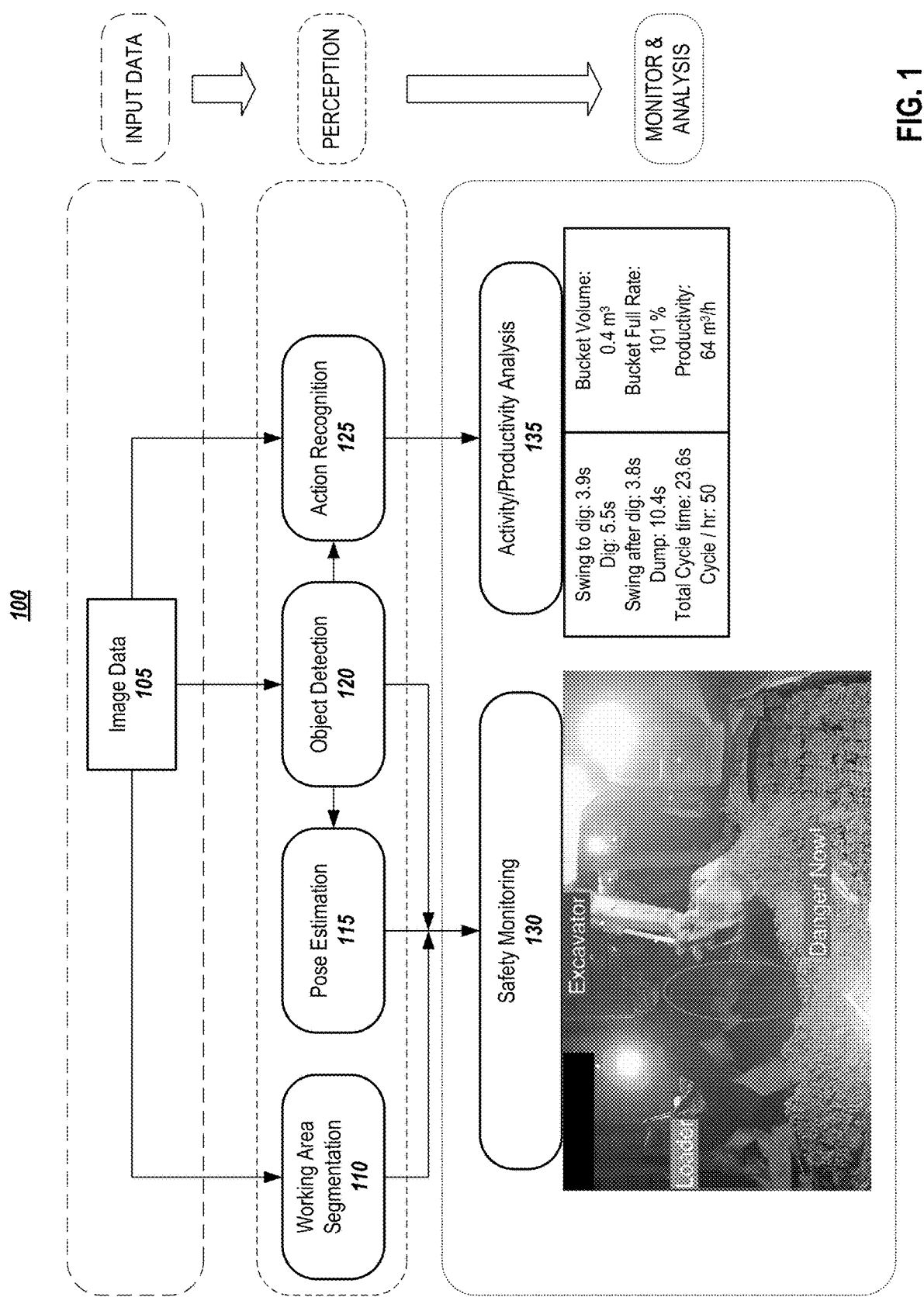
FIG. 1 depicts an object activity analysis and safety monitoring system pipeline, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of excavators or heavy equipment, aspects of the present disclosure are not so limited. Accordingly, aspects of the present disclosure may be applied or adapted for use with other machinery or objects and for us in other contexts.

A. General Introduction

With the recent advancements in deep learning and computer vision, artificial intelligence (AI)-powered construction machinery, such as autonomous excavator systems (AES), have made significant progress. In AES system, the excavator is assigned to load the waste disposal material into a designated area. However, safety is one of the most important sections in modern construction, especially where construction machines are more and more automated.

Because it may be desired to operate such systems 24-hour per day without any human intervention, one of the main issues is safety, where the vehicle could potentially collide with the environment or other machines or vehicles. Accordingly, embodiments herein address the issue of safety, where the excavator could potentially collide with the environment or other machines or items. Embodiments herein comprise a camera-based safety monitoring system that detects an excavator poses, the surrounding environment, and other construction machines, and warns of any potential collisions. In addition, based on action recognition on human activity, embodiments comprise recognizing excavator actions, which may also be used are part of an excavator productivity analysis system to analyze activities of the excavator. It should be noted that while embodiments are discussed in the context of AES, embodiments may also be generally applied to manned excavators and other vehicles or machinery.

As part of building an excavator safety monitor system, a perception system for the surrounding environment was developed. Embodiments of the perception system comprise detection, pose estimation, and activity recognition of construction machines. Detecting the excavator pose in real-time is an important feature to inform the workers and to enable autonomous operation. Vision-based (e.g., markerless and marker-based) and sensor-based (e.g., inertial measurement units (IMUs) and ultra-wideband (UWB) sensor-based positioning solutions) are two of the main methods for estimating robot pose. The marker-based and sensor-based methods require some additional pre-installed sensors or markers, whereas the marker-less methods typically only require an on-site camera system, which is common on modern construction sites. Therefore, embodiments herein adopt a marker-less approach and utilize a camera video input, leveraging state-of-the-art deep learning methods.

In this patent document, embodiments of a deep learning-based excavator activity analysis and safety monitor system are presented which can detect the surrounding environment, estimate poses, and recognize actions of excavators. Some of contributions in this patent document include, but are not limited to, the following:

1) An excavator dataset with ground truth annotations was created.

2) Embodiments of a deep learning-based perception system for multi-class object detection, pose estimation, and action recognition of construction machinery on construction sites was developed. Also, embodiments were tested against state-of-the-art (SOTA) systems, and it is shown herein that the tested embodiments get SOTA results on an autonomous excavator system dataset and a benchmark construction dataset.

3) Also presented herein are embodiments of a novel excavator safety monitor and productivity analysis system based on embodiments of the aforementioned perception system.

B. Some Related Works

Some previous studies related to safety and productivity analysis are reviewed here. Some areas of interest include basic tasks in computer vision that are useful to activity analysis and safety monitoring system, including object detection, image segmentation, pose estimation and action recognition. Also reviewed were vision-based activity analysis and safety monitoring system.

1. Object Detection

The first category is object detection. Recently, some used a region-based convolutional neural network (CNN) framework named Faster R-CNN (Shaoqing Ren, Kaiming He, Ross Girshick, and Jian Sun. Faster R-CNN: Towards Real-Time Object Detection With Region Proposal Networks. *IEEE Transactions On Pattern Analysis And Machine Intelligence*, 39(6): 1137-1149, 2016 (also available at arXiv: 1506.01497v3), which is incorporated by reference herein in its entirety) to detect workers standing on scaffolds. A deep CNN then classified whether workers are wearing safety belts. Those without safety belts appropriately harnessed were identified to prevent any fall from height.

2. Image Segmentation

Others used Mask R-CNN (H. Raoofi, and A. Motamedi, Mask R-CNN Deep Learning-based Approach to Detect Construction Machinery on Jobsites. 37*th International Symposium on Automation and Robotics in Construction (ISARC* 2020), Kitakyushu, Japan, October 2020, which is incorporated by reference herein in its entirety) to detect construction machinery on job sites. More importantly, a segmentation network like Mask R-CNN can be used to decide areas like digging and dumping.

3. Pose Estimation

A second group of technology is skeleton pose estimation. Pose estimation has been studied based on human pose estimation network like OpenPose. Soltani et al. (Mohammad Mostafa Soltani, Zhenhua Zhu, and Amin Hammad. Skeleton Estimation Of Excavator By Detecting Its Parts. *Automation in Construction*, 82:1-15, 2017, which is incorporated by reference herein in its entirety) have proposed skeleton parts estimation of excavators.

4. Action Recognition

Learning-based action recognition methods have been proposed. For example, Feichtenhofer et al. (Christoph Feichtenhofer, Haoqi Fan, Jitendra Malik, and Kaiming He. SlowFast Networks For Video Recognition. In *Proceedings Of The IEEE/CVF International Conference On Computer Vision*, pages 6202-6211, 2019, which is incorporated by reference herein in its entirety) proposed a SlowFast network for video recognition. The model involves a low pathway that operating at a low frame rate, to capture spatial semantics, and a Fast pathway that operating at a high frame rate, to capture motion at fine temporal resolution. Others presented a convolution-free approach to video classification built exclusively on self-attention over space and time.

5. Activity Analysis and Safety Monitoring

Presented here is a brief review of recent vision-based activity analysis and safety monitoring methods in the construction area. For example, some combined CNN with Long-Short-Term-Memory (LSTM) to identify unsafe actions of workers, such as climbing ladders with hand-carry objects, backward-facing, or reaching far. While safety hazards of workers were effectively identified, their method only captured a single worker, and multi-object analysis was not considered. On the other hand, Soltani et al. (cited above) used background subtraction to estimate the posture of an excavator by individually detecting each of its three skeleton parts including the excavator dipper, boom, and body. Although knowing the operating state of construction equipment would allow safety monitoring nearby, the influence of the equipment on the surrounding objects was not studied. Others proposed a framework to automatically recognize activities and analyze the productivity of multiple excavators. Yet others proposed a methodology to monitor and analyze the interaction between workers and equipment by detecting their locations and trajectories and identifying the danger zones using computer vision and deep learning techniques. However, the excavator state is not considered in their model. Some have proposed a benchmark dataset; however, their action recognition model accuracy is low compared to embodiments of the deep learning-based model herein.

Overall, in terms of activity analysis and safety monitoring with computer vision techniques, previous studies focused on different parts separately, such as identifying the working status of construction equipment or pose estimation of the excavator. Embodiments herein include advantages of SOTA deep learning models for detection, pose estimation, and action recognition tasks.

C. Framework Embodiments

An embodiment framework for object activity recognition, safety monitor, and productivity analysis depicted shown in FIG. 1. In one or more embodiments, the framework may comprise six main modules: object detection subsystem 120, excavator pose estimation subsystem 115, working area segmentation subsystem 110, activity recognition subsystem 125, safety monitor subsystem 130, and activity/productivity analysis subsystem 135. The input to system embodiments may be camera video 105 from one or more cameras. Embodiments are capable detecting multi-class objects (e.g., construction machines, human, etc.) in real-time. It shall be noted that various embodiments may comprise fewer and/or different subsystem—example embodiments are provided herein.

Figure 2:
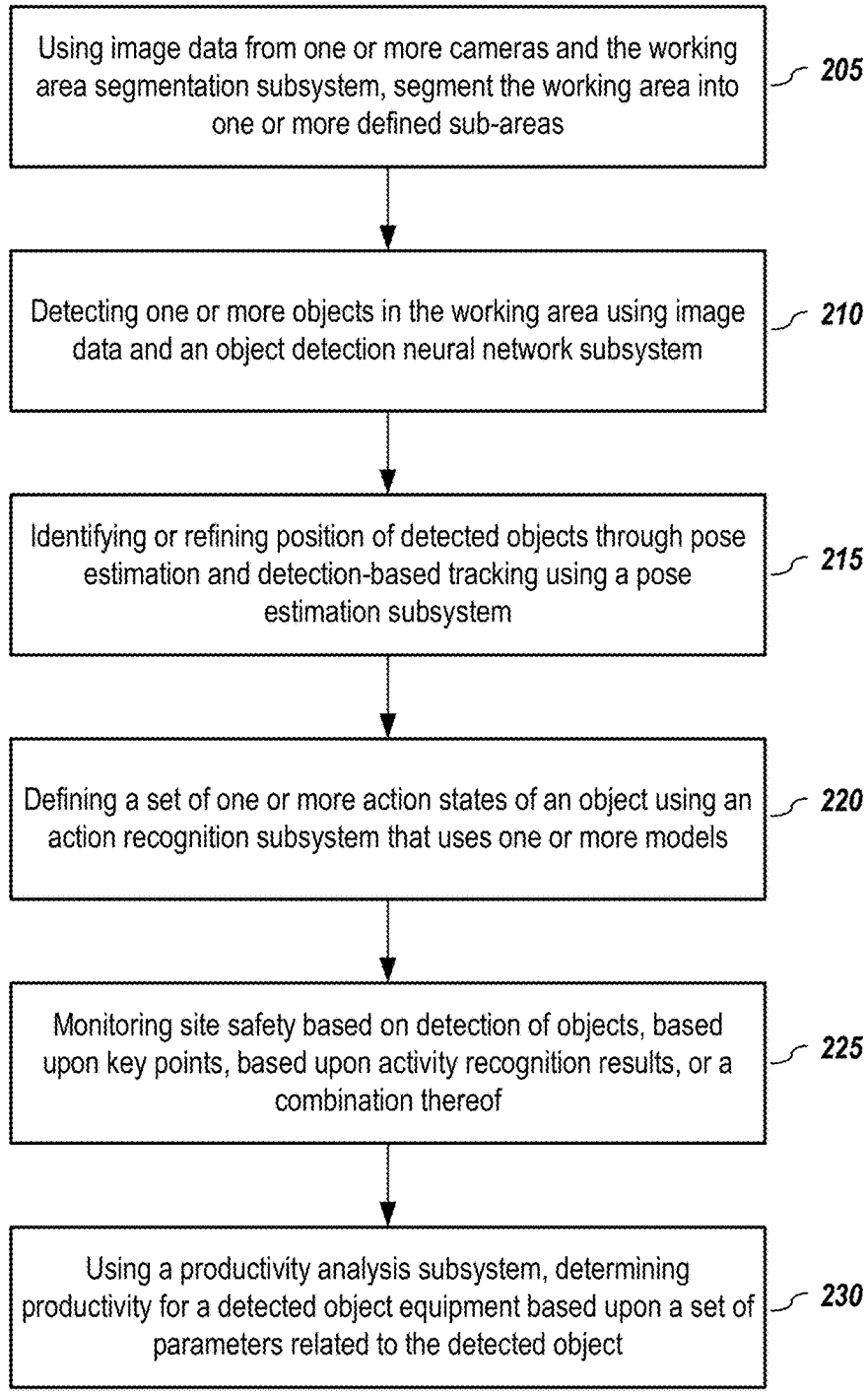
FIG. 2 depicts a safety monitoring and activity analysis methodology, according to embodiments of the present disclosure.
Figure 3:
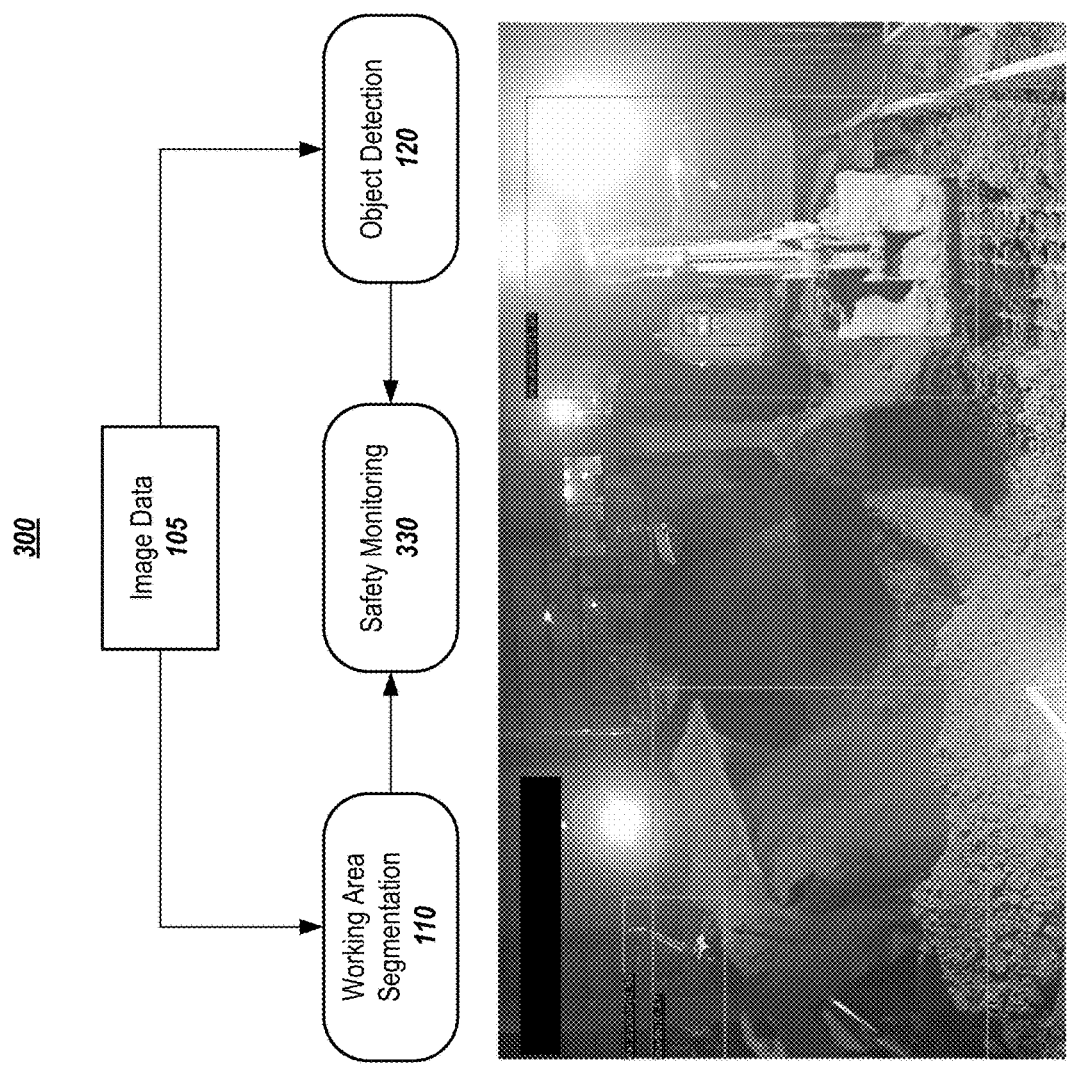
FIGS. 3-7 depict safety monitoring system architectures, according to embodiments of the present disclosure.
Figure 4:
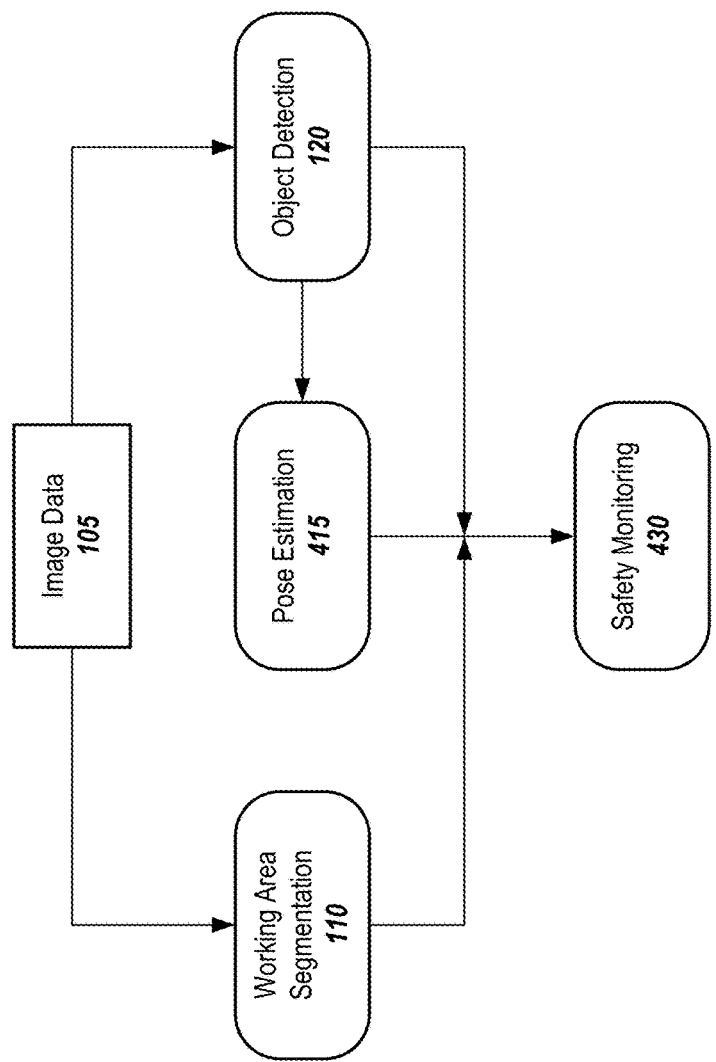
Figure 5:
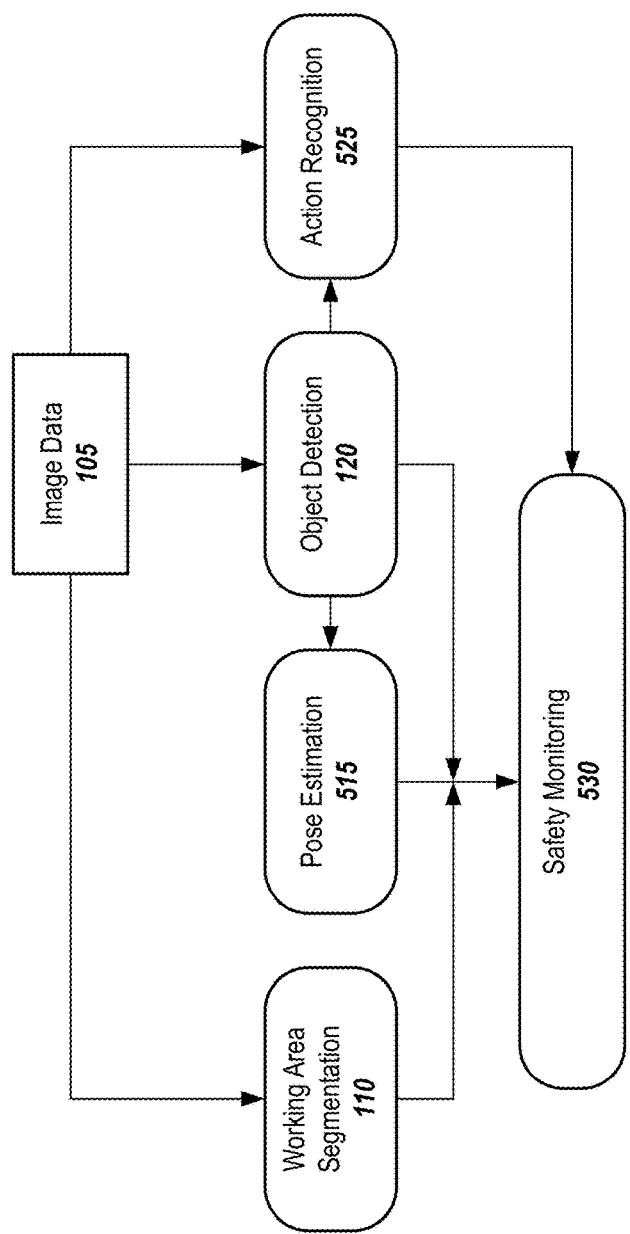
Figure 6:
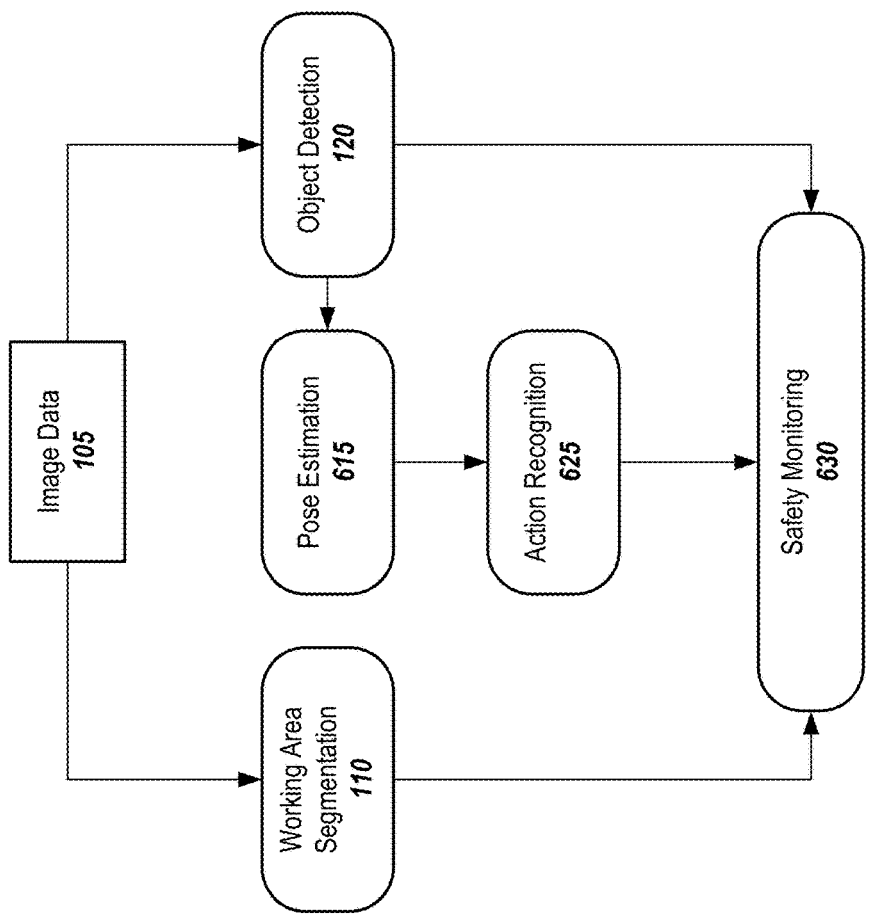
Figure 7:
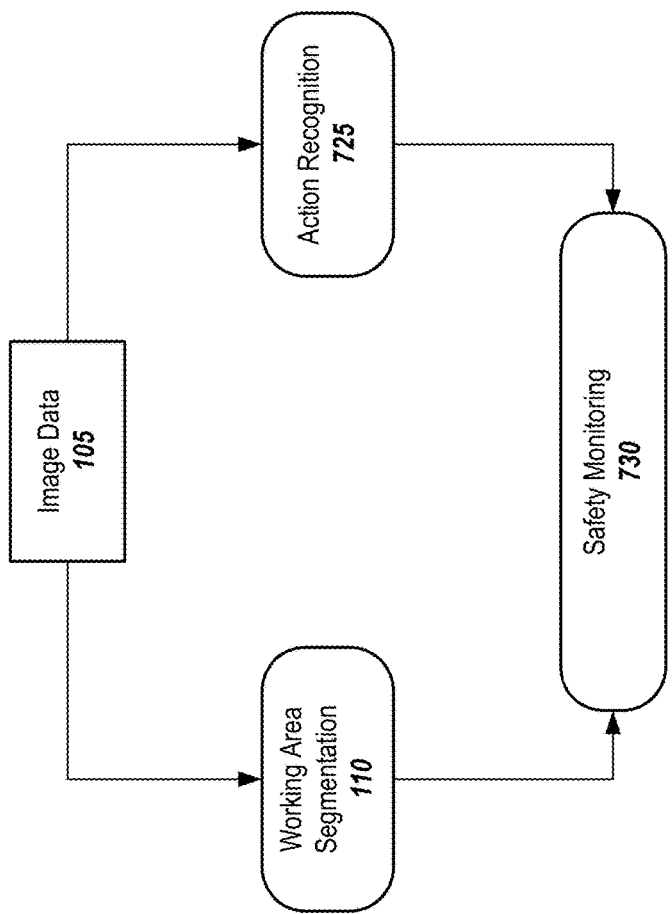

FIG. 2 depicts an example overall methodology, according to embodiments of the present disclosure. In one or more embodiments, working areas are first segmented (205) into one or more defined sub-areas (e.g., digging and dumping areas) using a working area segmentation subsystem 110. One or more detection methods of an object detection neural network subsystem 120 may be used (210) to identify objects (e.g., pieces of equipment, humans, etc.) in the video frames. In one or more embodiments, detection may also include classifying any detected objects—such as classifying the equipment type of machines in the video frames, labeling humans, etc. For purposes of illustration only, an excavator is used herein to help provide examples; however, it shall be noted that other pieces of equipment, and non-equipment (e.g., people, animals, structures, etc.) may also be detected and classified. In one or more embodiments, the objects may be identified or their position may be further refined (215) through pose estimation and detection-based tracking using a pose estimation subsystem 115.

In one or more embodiments, one or more action states of the tracked object(s) may also be recognized (220) using one or more models of an action estimation subsystem 125. For example, a key points model or models may be used in conjunction with a set of rules to define action states and/or an action neural network model may be used to determine action states. In one or more embodiments, action states may be used by a safety monitory subsystem 130 to help recognize safety issues. For example, if a piece of equipment or a person is about to commence an unsafe action, an alert may be made (e.g., trigger one or more signals like lights and sounds, send one or more messages to an operator or administrator, send instruction signal to cause equipment to take certain action or take no action, etc.). For example, for an autonomous equipment, the alert may be a signal to the equipment to cause it to stop the action. Additionally or alternatively, if a non-normal action is detected, an alert may be made. In one or more embodiments, action states may be used by an activity/productivity analysis subsystem 1135.

As explained in more detail with respect to embodiments discussed below, a safety monitoring subsystem 130 may receive inputs from various other subsystems to monitor (225) site safety based on detection of objects (e.g., their positions), based upon key points, based upon activity recognition results, or a combination thereof depending upon embodiments.

In one or more embodiments, the productivity of an object may be determined (230) using a productivity analysis subsystem 135 that receives, for a detected object, at least some of the action states from the action recognition subsystem and determines productivity for the detected object based upon a set of parameters related to the detected object.

Figure 8:
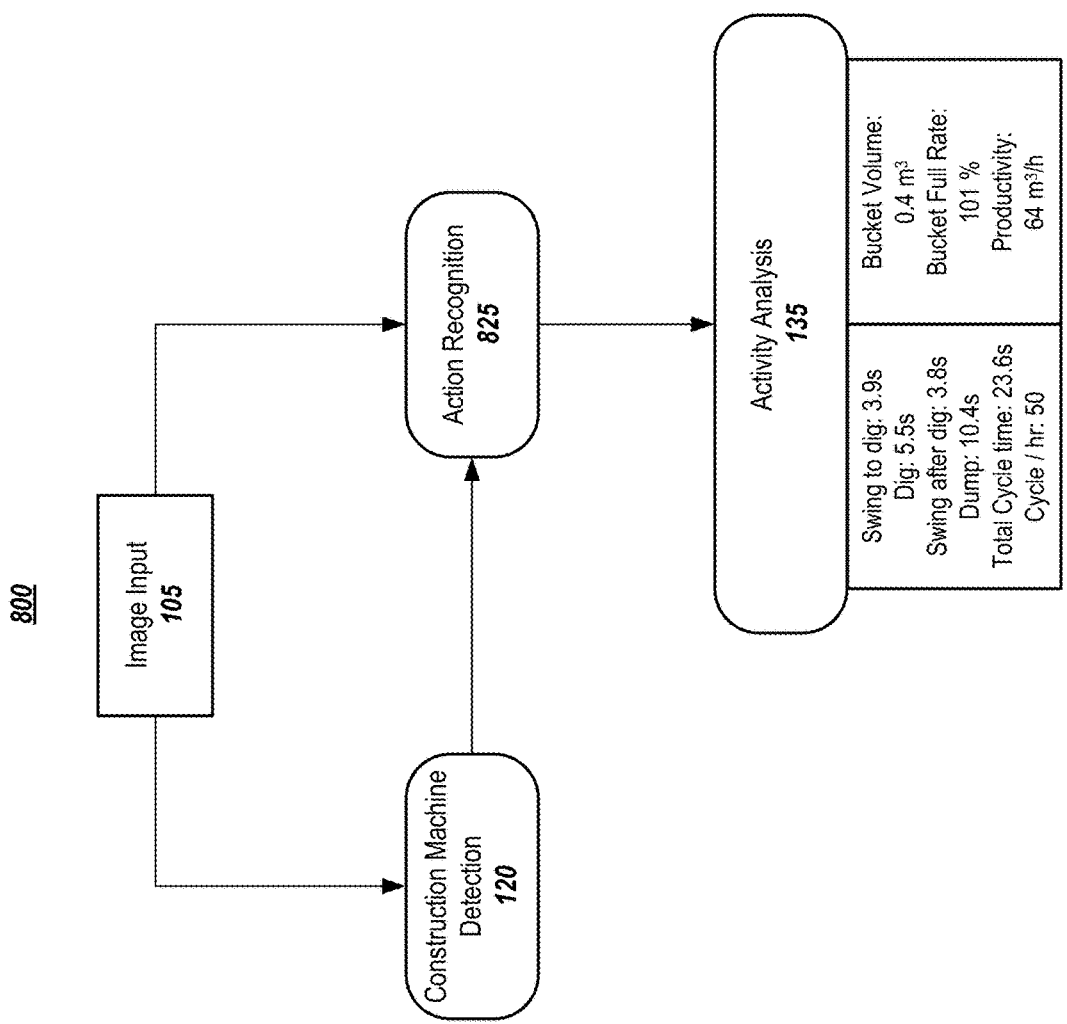
FIG. 8 an activity analysis system, according to embodiments of the present disclosure.

It shall be noted that different embodiments may be formed. Note that, depending upon the embodiment, safety monitoring may be performed, activity/productivity analysis may be performed, or both may be performed. FIGS. 3-7 depict different safety monitoring systems, according to various embodiments of the present disclosure. FIG. 8 depicts an example action or productivity analysis system, according to embodiments of the present disclosure.

The details about embodiments of each module in the framework are provided in the following sub-sections.

1. Object Detection Embodiments

Figure 9:
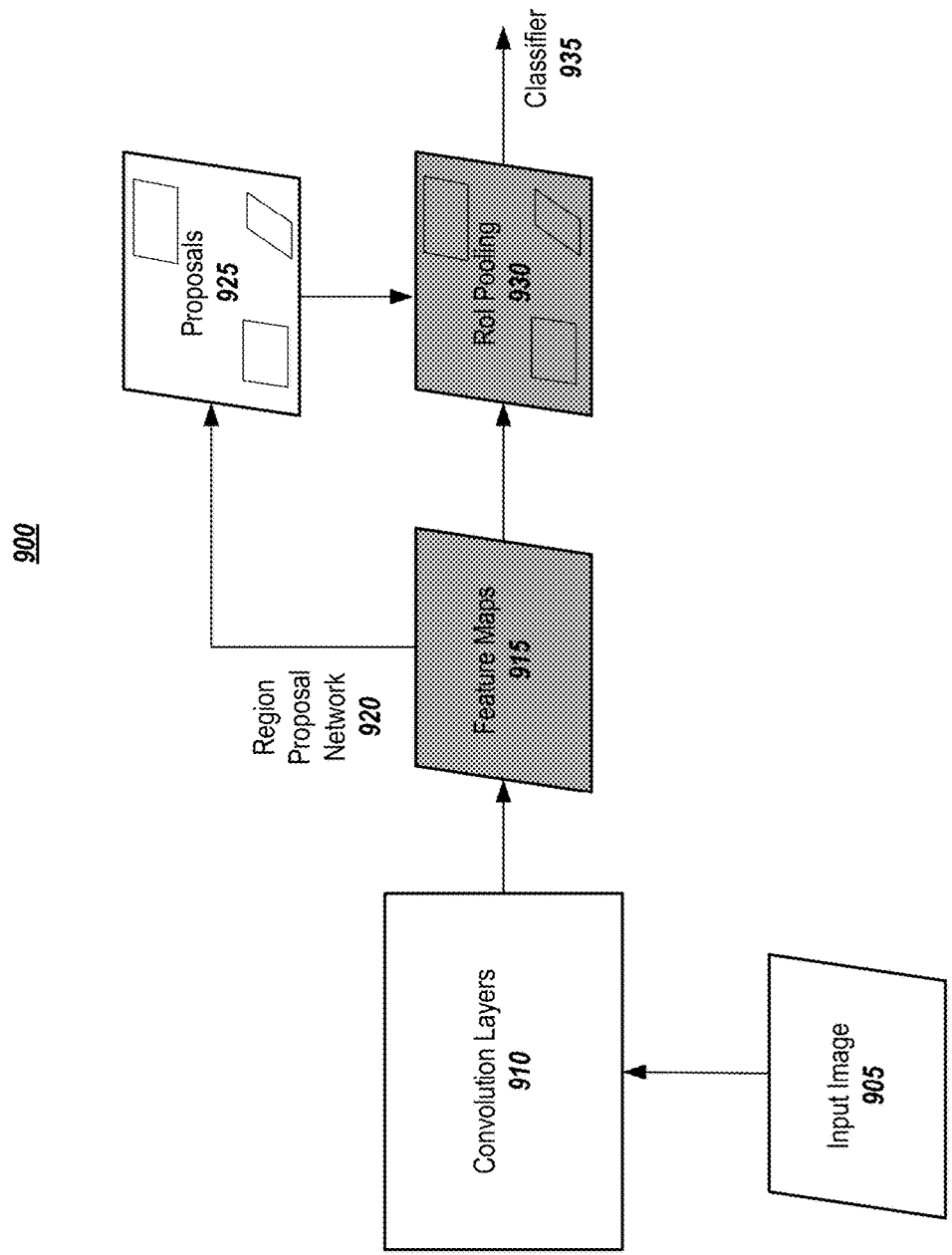
FIG. 9 depicts example architecture for object detection, according to embodiments of the present disclosure.

In one or more embodiments, detection of construction equipment may be realized based on Faster R-CNN (Ren et al., 2016, which was cited above) network. FIG. 9 depicts an example architecture 900, according to embodiments of the present disclosure. The architecture of Faster R-CNN includes (1) backbone, convolutional network 910 to extract image features 915; (2) region proposal generate (RPN) network 920 for generating region of interest (ROI) 925, and (3) classification network 935 for producing class scores and bounding boxes for objects.

To remove duplicate bounding box, a Soft-NMS (non-maximum suppression) (e.g., Navaneeth Bodla, Bharat Singh, Rama Chellappa, and Larry S Davis. Soft-NMS—Improving Object Detection With One Line Of Code. In *Proceedings of the IEEE International Conference On Computer Vision*, pages 5561-5569, 2017, which is incorporated by reference herein in its entirety) may be used to limit max bounding box per object to 1.

Figure 10:
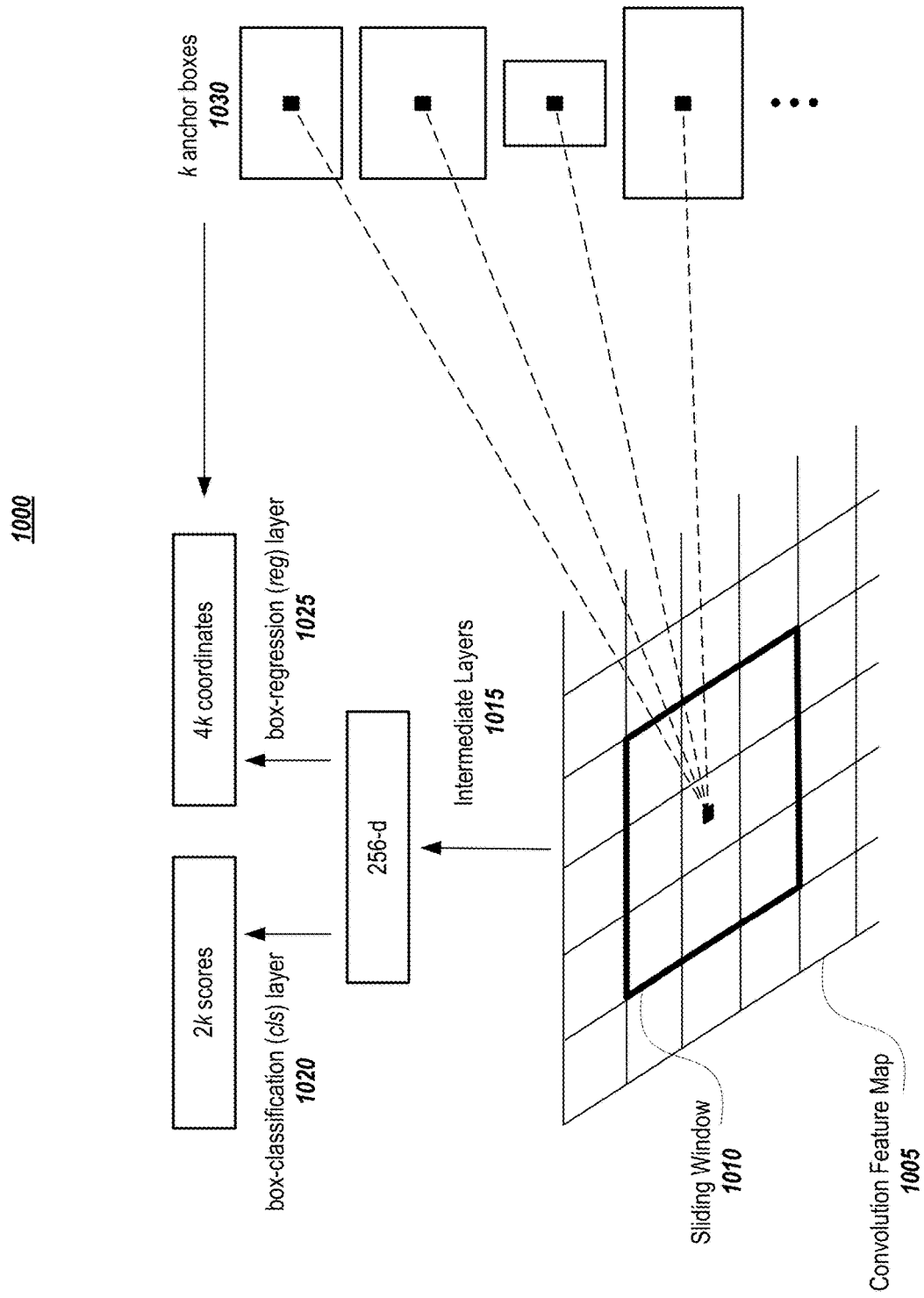
FIG. 10 graphically depicts a Region Proposal Network (RPN), according to embodiments of the present disclosure.

FIG. 10 graphically depicts a Region Proposal Network (RPN), according to embodiments of the present disclosure. The RPN serves as "attention" for the unified Faster R-CNN network. The RPN takes an image as input and outputs a set of rectangular object proposals, each with an objectness score. To generate region proposals, a small network is slide over the convolutional feature map output by the last shared convolutional layer. This small network takes as input an n×n spatial window of the input convolutional feature map, and each sliding window is mapped to a lower-dimensional feature, which is fed into two sibling fully-connected layers-a box-regression layer (reg) and a box-classification layer (cls), which may be 1×1 conv. layers and are illustrated in FIG. 10.

Note that at each sliding-window location, the system may simultaneously predict multiple region proposals (up to k possible proposals for each location). The reg layer may have 4k outputs encoding the coordinates of k boxes, and the cls layer may output 2k scores that estimate probability of object for each proposal. The k proposals may be parameterized relative to k reference boxes, which may be referred to as anchors. An anchor may be centered at the sliding window in question and may be associated with a scale and aspect ratio. If there are 3 scales and 3 aspect ratios, then there are k=9 anchors at each sliding position.

In one or more embodiments, a Faster R-CNN model workflow may be described as follows. Step 1 comprising pre-training a CNN network on image classification tasks.

Step 2 comprises fine-tuning the region proposal network (RPN) end-to-end for the region proposal task, which may be initialized by the pre-train image classifier. In one or more embodiments, positive samples intersection-over-union (IoU)>0.7, while negative samples have IoU<0.3. A small n×n spatial window may be slide over the convolution feature map of the entire image. At the center of each sliding window, multiple regions of various scales and ratios are simultaneously predicted. An anchor may be defined, for example, as a combination of (sliding window center, scale, ratio). For example, 3 scales×3 ratios results in k=9 anchors at each sliding position; however, it shall be noted that different anchor values may be used.

Step 3 comprises training a Fast R-CNN object detection model using the proposals generated by the current RPN.

Step 4 comprises using the Fast R-CNN network to initialize RPN training. In one or more embodiments, the shared convolutional layers may be fixed, while the RPN-specific layers are fine-tuned. Note that, at this stage, RPN and the detection network have shared convolutional layers.

Step 5 comprise fine-tuning the unique layers of Fast R-CNN. In one or more embodiments, Steps 4 and 5 may be repeated to train RPN and Fast R-CNN alternatively.

In one or more embodiments, the Faster R-CNN may be optimized for a multi-task loss function. The multi-task loss function may combine the losses of classification and bounding box/bounding region regression:

$$\mathcal{L} = \mathcal{L}_{cls} + \mathcal{L}_{box}$$

$$\mathcal{L}(\{p_i\}, \{t_i\}) = \frac{1}{N_{cls}} \sum_i \mathcal{L}_{cls}(p_i, p_i^*) + \frac{\lambda}{N_{box}} \sum_i p_i^* \cdot L_1^{smooth}(t_i - t_i^*)$$

where $\mathcal{L}_{cls}$ is the log loss function over two classes, as one can easily translate a multi-class classification into a binary classification by predicting a sample being a target object or is not the target object. $p_{i,i}$ represents the predicted probability of anchor i being an object. $p_i^*$ represents the binary ground truth label of whether anchor i is an object. $t_i$ represents the predicted four parameterized coordinates, and $t^*_i$ represents the ground truth coordinates. $N_{cls}$ represents a Normalization term, which may be set to mini-batch size (~256, although different values may be used). $N_{box}$ represents a Normalization term, which may be set to the number of anchor locations (~2400, although different values may be used). Finally, λ represents a balancing parameter, set to be ~10 (although different values may be used) so that both $L_{cls}$ and $L_{box}$ terms are roughly equally weighted. $L_1^{smooth}$ represents the smooth L1 loss:

$$\mathcal{L}_{cls}(P_i, P^*_i) = -P^*_i \log P_i - (1-P^*_i)\log(1-P_i)$$

Alternatively, instead of a Faster R-CNN model, other models may be used for detection of construction equipment. For example, YOLOv3 (Joseph Redmon and Ali Farhadi. YOLOv3: An incremental improvement, 2018, which is available at arxiv.org/abs/1804.02767, which is incorporated by reference herein in its entirety) may be used. YOLOv3 is a one-stage state-of-art detector that is extremely fast. The system architecture may be as follows:

| | Type | Filters | Size | Output |
|---|---|---|---|---|
| | Convolutional | 32 | 3 × 3 | 256 × 256 |
| | Convolutional | 64 | 3 × 3/2 | 128 × 128 |
| 1x | Convolutional | 32 | 1 × 1 | |
| | Convolutional | 64 | 3 × 3 | |

-continued

| | Type | Filters | Size | Output |
|---|---|---|---|---|
| | Residual | | | 128 × 128 |
| | Convolutional | 128 | 3 × 3/2 | 64 × 64 |
| 2x | Convolutional | 64 | 1 × 1 | |
| | Convolutional | 128 | 3 × 3 | |
| | Residual | | | 64 × 64 |
| | Convolutional | 256 | 3 × 3/2 | 32 × 32 |
| 8x | Convolutional | 128 | 1 × 1 | |
| | Convolutional | 256 | 3 × 3 | |
| | Residual | | | 32 × 32 |
| | Convolutional | 512 | 3 × 3/2 | 16 × 16 |
| 8x | Convolutional | 256 | 1 × 1 | |
| | Convolutional | 512 | 3 × 3 | |
| | Residual | | | 16 × 16 |
| | Convolutional | 1024 | 3 × 3/2 | 8 × 8 |
| 4x | Convolutional | 512 | 1 × 1 | |
| | Convolutional | 1024 | 3 × 3 | |
| | Residual | | | 8 × 8 |
| | Avgpool | | Global | |
| | Connected | | 1000 | |
| | Softmax | | | |

Alternatively, YOLOv5 (Glenn Jocher et al., Ultralytics/ YOLOv5, which is available at zenodo.org/record/4154370 for version 3.1 and zenodo.org/record/6222936 for version 6.1, which are incorporated by reference herein in their entirety) may be used. YOLOv5 utilized Cross Stage Partial Network (CSPNet) as a backbone. In one or more embodiments, to improve inference speed, reduce model size, and further improve detection accuracy, embodiments implement real-time detection of objects (e.g., construction machines and humans) based on YOLOv5. YOLOv5 has different size models including YOLOv5s, YOLOv5m, YOLOv5l, and YOLOv5x. Generally, YOLOv5 respectively uses the architecture of CSPDarknet53 with an SPP (Spatial pyramid pooling) layer as backbone, PANet as Neck and YOLO detection head. To further optimize the whole architecture, freebies and specials are available (see, e.g., A. Bochkovskiy et al., "YOLOv4: Optimal speed and accuracy of object detection," which is available at arXiv:2004.10934 (2020), which is incorporated by reference herein in its entirety). Since it is the most notable and convenient one-stage detector, it was select for embodiments as a baseline. To improve human detection accuracy in all scenery, embodiments involved fine-tuning a pretrained YOLOv5 model on a construction dataset.

2. Pose Estimation Embodiments

Figure 11:
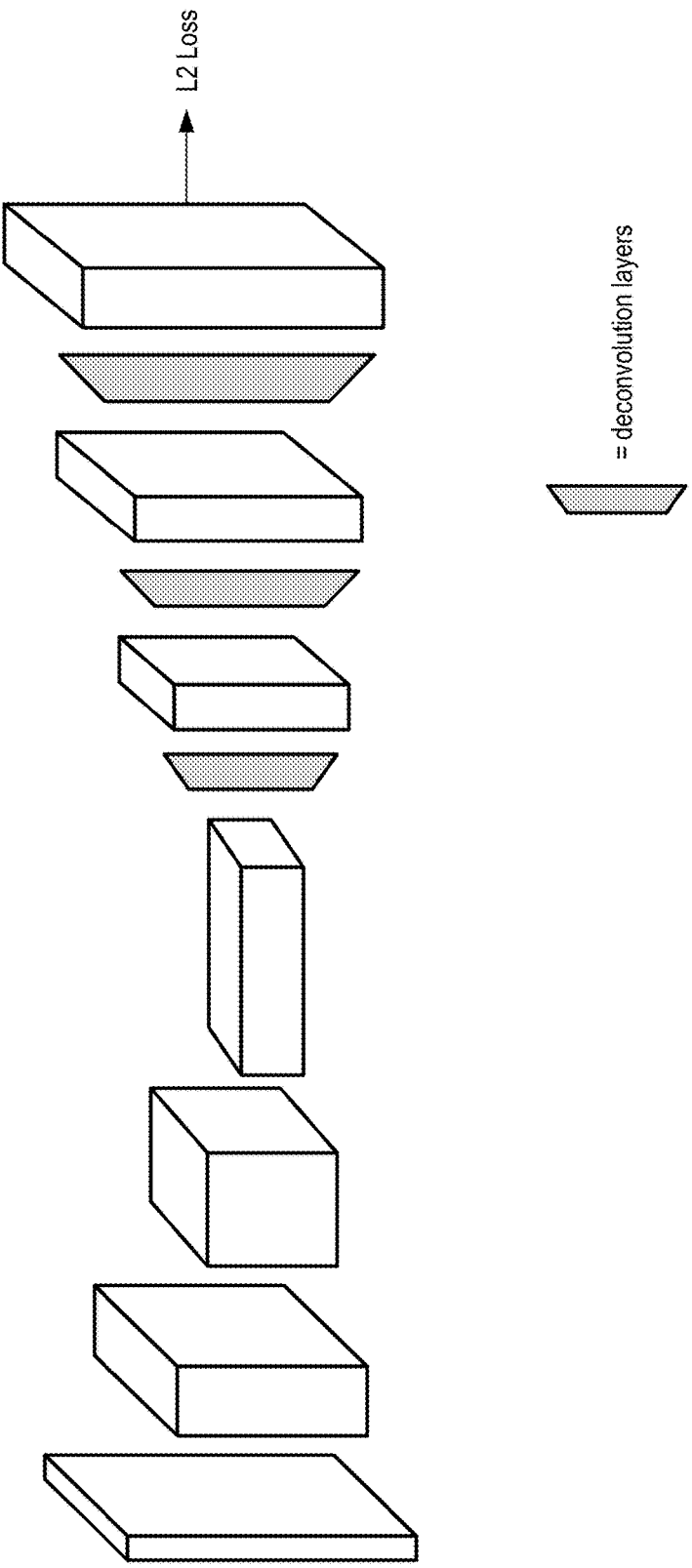
FIG. 11 graphically depicts an example network structure for pose estimation, according to embodiments of the present disclosure.

In one or more embodiments, a pose estimation subsystem may be based on the output bounding box from detection. In one or more embodiments, a system for pose estimation may employ ResNet, which is one of the most common backbone network for image feature extraction and for pose estimation. In one or more embodiments, deconvolutional layers over the last convolution stage in the ResNet may be added. FIG. 11 graphically depicts an example network structure 1100, according to embodiments of the present disclosure. In one or more embodiments, a system such as the one described in Bin Xiao, Haiping Wu, and Yichen Wei. Simple Baselines for Human Pose Estimation and Tracking. In *Proceedings of the European Conference on Computer Vision (ECCV)*, pages 466-481, 2018 (hereinafter, Xiao et al.) (which is incorporated by reference herein in its entirety) may be employed.

In one or more embodiments, a labeling method may be employed for an object. For example, a labeling method was designed for the fixed crawler excavator as 10 keypoints.

Figure 12:
FIG. 12 depicts an excavator and corresponding labeled 10 parts of excavators including 2 bucket end keypoints (bucket end1, bucket end2), bucket joint, arm joint, boom cylinder, boom base and 4 body keypoints (body1, body2, body3, body4), according to embodiments of the present disclosure.

The keypoints of excavator parts annotation are shown in FIG. 12. These 10 keypoints include: 2 bucket end keypoints, bucket joint, arm joint, boom cylinder, boom base, and 4 body keypoints. Unlike other pose label methods that label bucket/excavator body as the middle point, one or more embodiments herein label corner point to improve accuracy. Other labelings may be set for other objects, such as different pieces of equipment, a human, etc.

3. Working Area Segmentation Embodiments

Figure 13:
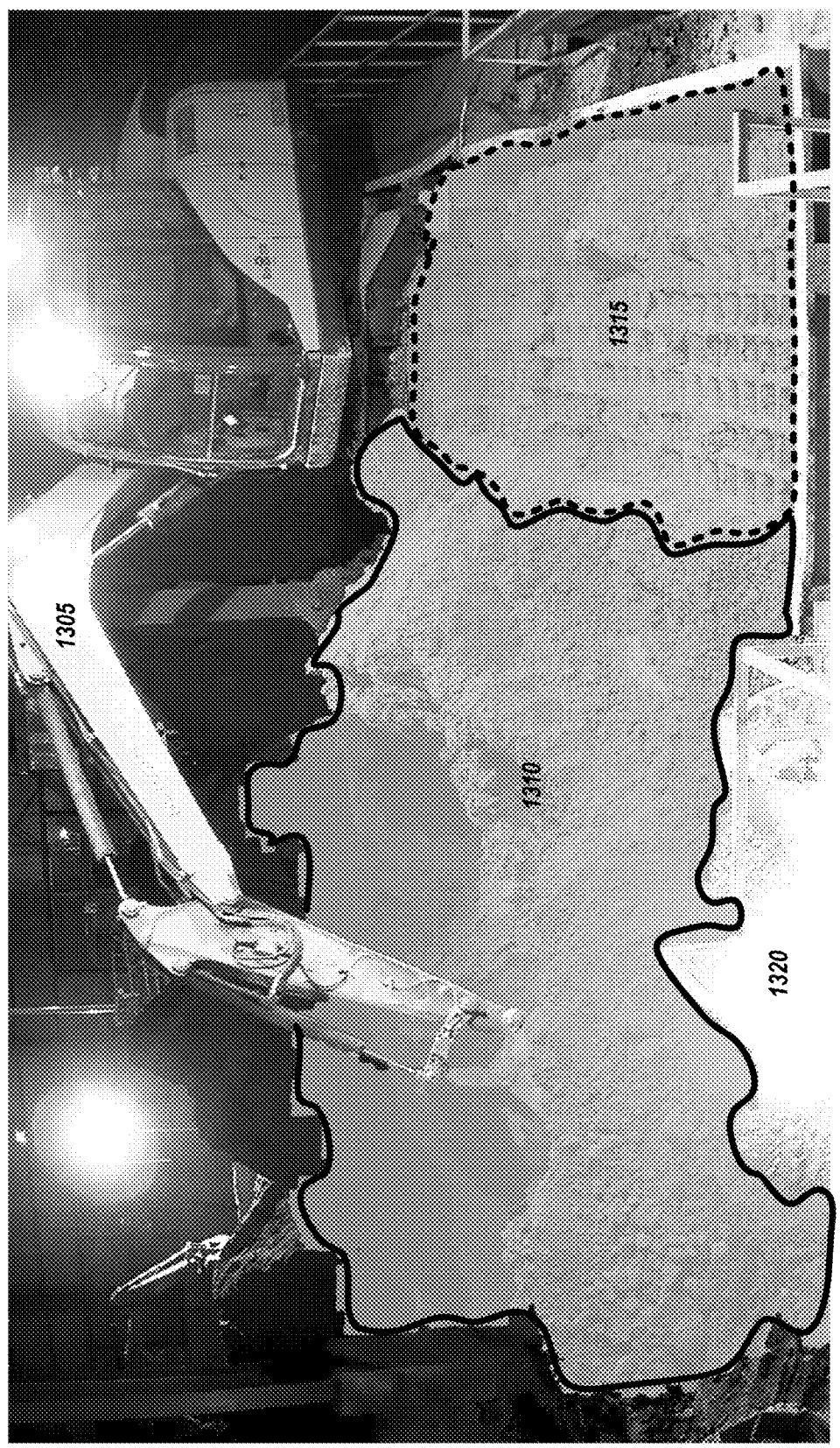
FIG. 13 depicts an example area segmentation in defined sub-areas, according to embodiments of the present disclosure.

In one or more embodiments, image segmentation is used to decide one or more sub-regions or sub-areas, such as digging and dumping areas. For example, FIG. 13 depicts a work site that has been divided based upon image segmentation. As depicted, the area 1315 within the dash line is the dumping area, the area 1310 within the solid line is the digging 1310. In one or more embodiments, one or more additional areas or objects may also be identified. For example, the excavator 1305 may be identified, and non-digging and non-dumping area, i.e., area 1320, may also be segmented (or may be segmented as a result of not being any of the other identified areas).

In one or more embodiments, the segmentation network may be a ResNet network or may be based upon a ResNet network (Kaiming He, Xiangyu Zhang, Shaoqing Ren, and Jian Sun. Deep residual learning for image recognition. In Proceedings of the IEEE Conference on Computer Vision and Pattern Recognition (CVPR), pages 770-778, 2016, which is incorporated by reference herein in its entirety). A digging area may be defined as the waste recycling area, which including various toxic materials, and a dumping area may be a designated area to dump waste.

4. Action Recognition Embodiments

One or more actions may be defined for each of the objects, although some objects (such as structures) may have no actions defined for them. By way of illustration, consider the excavator, which has been used an example herein. In one or more embodiments, three actions may be defined for an excavator: (1) Digging, (2) Swinging, and (3) Dumping. An autonomous excavator may have four defined states: (1) Digging state, (2) Swinging after digging state, (3) Dumping state, and (4) Swinging for digging state. More precisely, digging indicates loading the excavator bucket with target material; swinging after digging indicates swinging the excavator bucket to the dumping area; dumping means unloading the material from the bucket to the dumping area, and swinging for digging means swinging the bucket to the working area. In one or more embodiments, there may also be an optional Idle state, for example, when the excavator is in manned mode, malfunction status, or other mode.

Figure 14:
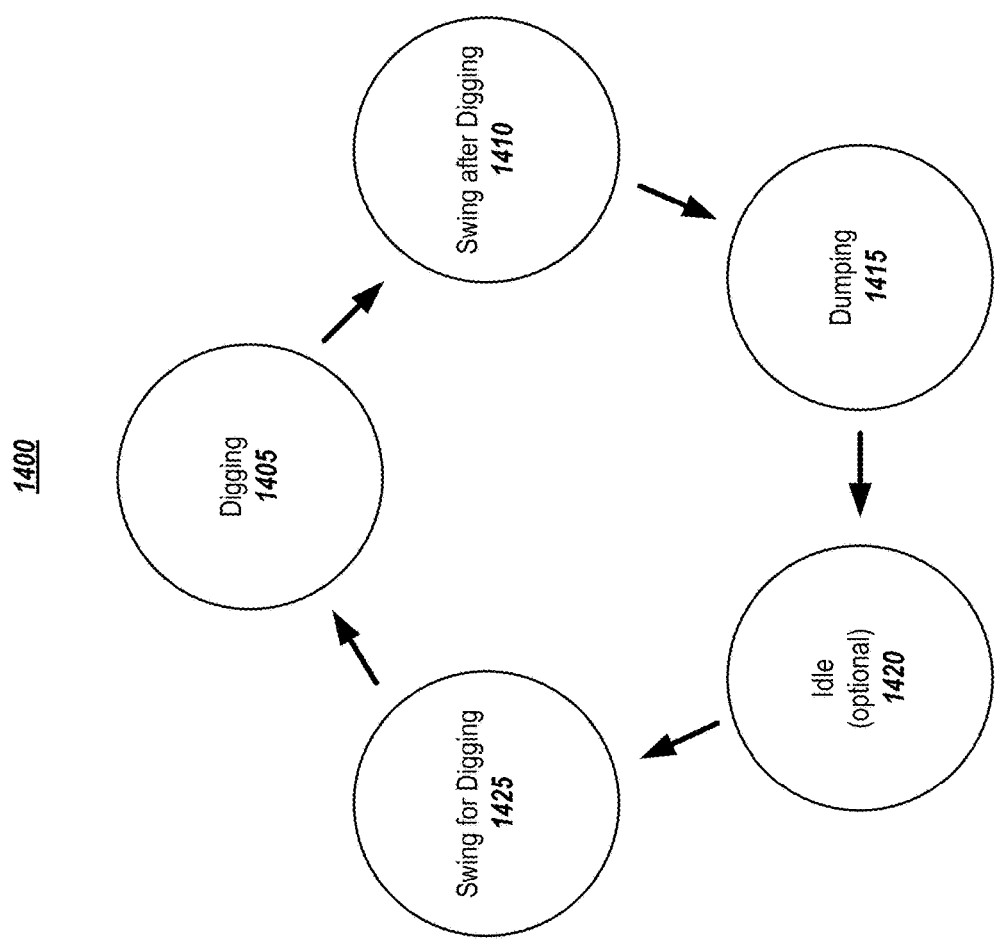
FIG. 14 depicts an example autonomous excavator working cycle, according to embodiments of the present disclosure.

FIG. 14 depicts an excavator working cycle, according to embodiments of the present disclosure. As illustrated in FIG. 14, the excavator may be in one of a number of states including: digging 1405, swing after digging 1410, dumping 1415, idle 1420, and swing for digging 1425. It shall be noted that different states may be defined and may be differently configured or ordered.

In one or more embodiments, the action recognition may be implemented as a rules-based model, as a deep-learning-based model, or both. Also, in one or more embodiments, keypoints and/or pose information may be used to help refine a bounding region for an object. That is, given a set of keypoints, given a pose, or given both keypoints and a pose, a pose estimation model may refine a bounding region from the object detection to provide a more exact or more nuanced bounding region.

a) Rules-Based Model Embodiments

In one or more embodiments, to determine the action state, the object's position is determined based on keypoints that are obtain from pose estimation and image segmentation results. Then, continuous frames of pose keypoints and one or more rules related to the keypoints may be used to define poses. Consider, for example, examination of frames of pose keypoints of body 1, body 2, body 3, and body 4, which may be used to decide whether the excavator is in the swing state. A threshold for keypoints movement may be set: if the mean of each pose keypoints of body 1-4 movements is smaller than a set value, then the excavator body may be considered as being still. Otherwise, the excavator body may be considered as not being still (i.e., the excavator body is in motion). The poses from the rule-based model may be used in the safety monitoring subsystem.

In one or more embodiments, excavator action states may be defined as follows:

1. Digging state: buckets/arm joint in digging area and keypoints body 1-4 are fixed points (excavator body is stilled).
2. Swinging state: buckets/arm joint in working area and one or more of keypoints body 1-4 are not fixed points (excavator body is not still). If that condition is met, a determination is made whether the excavator is in a "Swing for digging" state or in a "Swing after digging" state by the previous state. If the previous state was a "Dumping" state, the excavator state will be in a "Swing for digging" state; otherwise, it will be in a "Swing after digging" state.
3. Dumping state: buckets/arm joint in dumping area and keypoints body 1-4 are fixed points (excavator body is stilled).
4. Idle state: buckets/arm joint in dumping area and buckets/arm joint/body 1-4 are fixed points (excavator arm and body are both still).

One skilled in the art shall recognize that other rule-based models may be set for other detected objects.

b) Neural Network-based Model Embodiments

Figure 15:
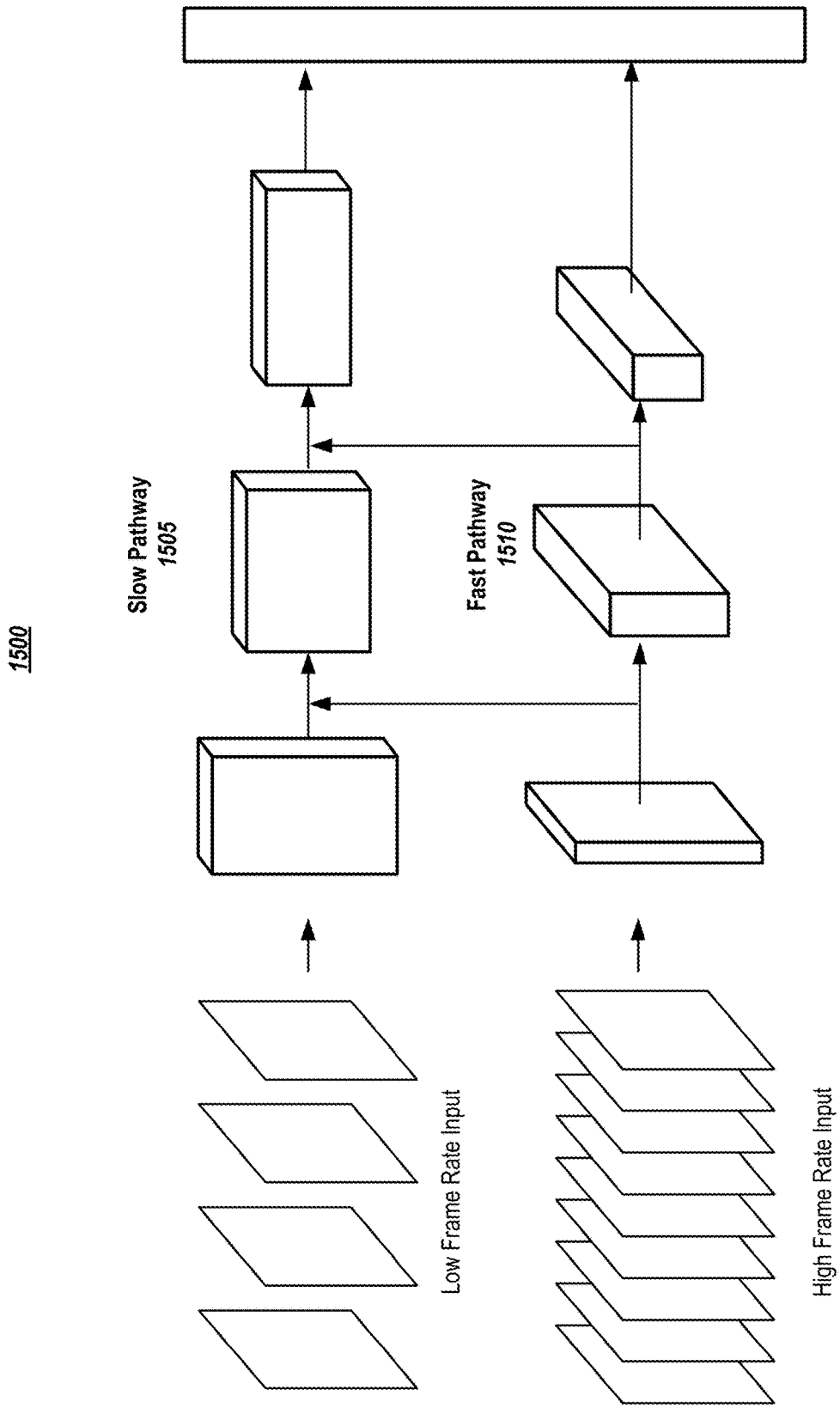
FIG. 15 depicts a network for action recognition, according to embodiments of the present disclosure.

In one or more embodiments, a more general deep learning-based action recognition method, such as one based on SlowFast (Christoph Feichtenhofer, Haoqi Fan, Jitendra Malik, and Kaiming He. SlowFast Networks For Video Recognition. In *Proceedings of the IEEE/CVF International Conference On Computer Vision*, pages 6202-6211, 2019, which is incorporated by reference herein in its entirety) may be used for action recognition. As illustrated in FIG. 15, in one or more embodiments, the model 1500 comprises (i) a Slow pathway 1505, operating at a low frame rate, to capture spatial semantics, and (ii) a Fast pathway 1510, operating at a high frame rate, to capture motion at fine temporal resolution. ResNet-50 may be used as the backbone. The Fast pathway 1510 may be made very lightweight by reducing its channel capacity yet learns useful temporal information for video recognition.

In one or more embodiments, a deep learning version of the pose estimation subsystem may comprise one or more neural network models that identify keypoints, poses, poses using keypoints, and/or actions (whether based upon keypoints, poses, poses using keypoints, or directly determining actions).

Embodiments of the deep learning action recognition model may be used in conjunction with the safety monitoring subsystem, the productivity analysis subsystem, or both.

Figure 16:
FIG. 16 depicts an autonomous excavator and a loader that may have potential safety issue, according to embodiments of the present disclosure.

5. Safety Monitor—Detect Potential Construction Machine Collision Embodiments In a busy construction site, there is always a possibility for safety issues. This problem is exacerbated with the use of autonomous vehicles or other autonomous equipment. In the solid waste recycle scene, excavators usually work with other equipment, such as loaders. For example, an excavator digs the waste and dumps it into a dumping area. When waste is empty in the digging area, the loader will load and dump waste in the digging area. For example, as shown in FIG. 16, the autonomous excavator 1605 and the loader 1610 may have potential collision 1615. Thus, it is important to detect potential collision because the loader may not know which state the excavator is currently at from the loader's view. A danger signal 1620 may be sent when the autonomous excavator and the loader machines are both detected in the digging area or detected to potentially operating in an overlapping region.

In one or more embodiments, the object detection information may be used to determine dangers. For example, detection of the excavator 1605 may include a bounding region 1625, which may be defined to encompass a typical working area for the detected object. Similarly, there is a bounding region 1630 for the loader. If more than one machine is detected within the same region (e.g., digging 1615 or working area), then an alert may be made to a user or users, or one or more of the autonomous vehicles may pause until the issue is cleared.

Some additional safety rules may include (by way of example and not limitation): (1) using the bounding region data of a first object and the bounding region data of a second object to monitor for safety by determining if the bounding region data of the first object is within a threshold distance of the bounding region data of the second object; (2) using the bounding region data of a first object and at least one of the one or more defined sub-areas to monitor for safety by determining if a threshold portion of the bounding region data of the first object is within one of the defined sub-areas (e.g., a person should never be in area X); (3) using the bounding region data of a first object, the bounding region data of a second object, and at least one of the one or more defined sub-areas to monitor for safety by determining if a first threshold portion of the bounding region data of the first object and a second threshold portion of the bounding region data of the second object are within same defined sub-areas; (4) whether a detected object is in a non-normal pose; and (5) whether a detected object is in a non-normal action state or a non-normal sequence of action states. One skilled in the art shall recognize that a number of different safety rules may be set and may take various inputs depending upon the embodiment (e.g., embodiments in FIG. 1 and FIGS. 3-7, by way of examples).

6. Productivity Analysis Embodiments

In one or more embodiments, the productivity of a detected object (e.g., equipment or human) may be based on the activity recognition results. The productivity analysis subsystem may receive, for an object, at least some of the action states from the action recognition subsystem and may determine productivity for the object based upon a set of parameters comprising one or more object-related parameters and the action state(s).

For example, the excavator's productivity may be calculated with the cycle time, the bucket payload, and the average bucket full rate, as shown in Equation 1. Since the bucket payload is given by the manufacturer, the target of the productivity calculation becomes to determine the cycle time of the excavator. To simplify the procedure, the two types of swinging (swinging after digging and swinging for digging) may not be distinguished.

$$\text{Productivity}(m^3/hr) = \frac{\text{Cycles}}{hr} \times \text{BucketVolume}(m^3) \times \text{Bucket Full Rate} \quad (1)$$

Figure 17:
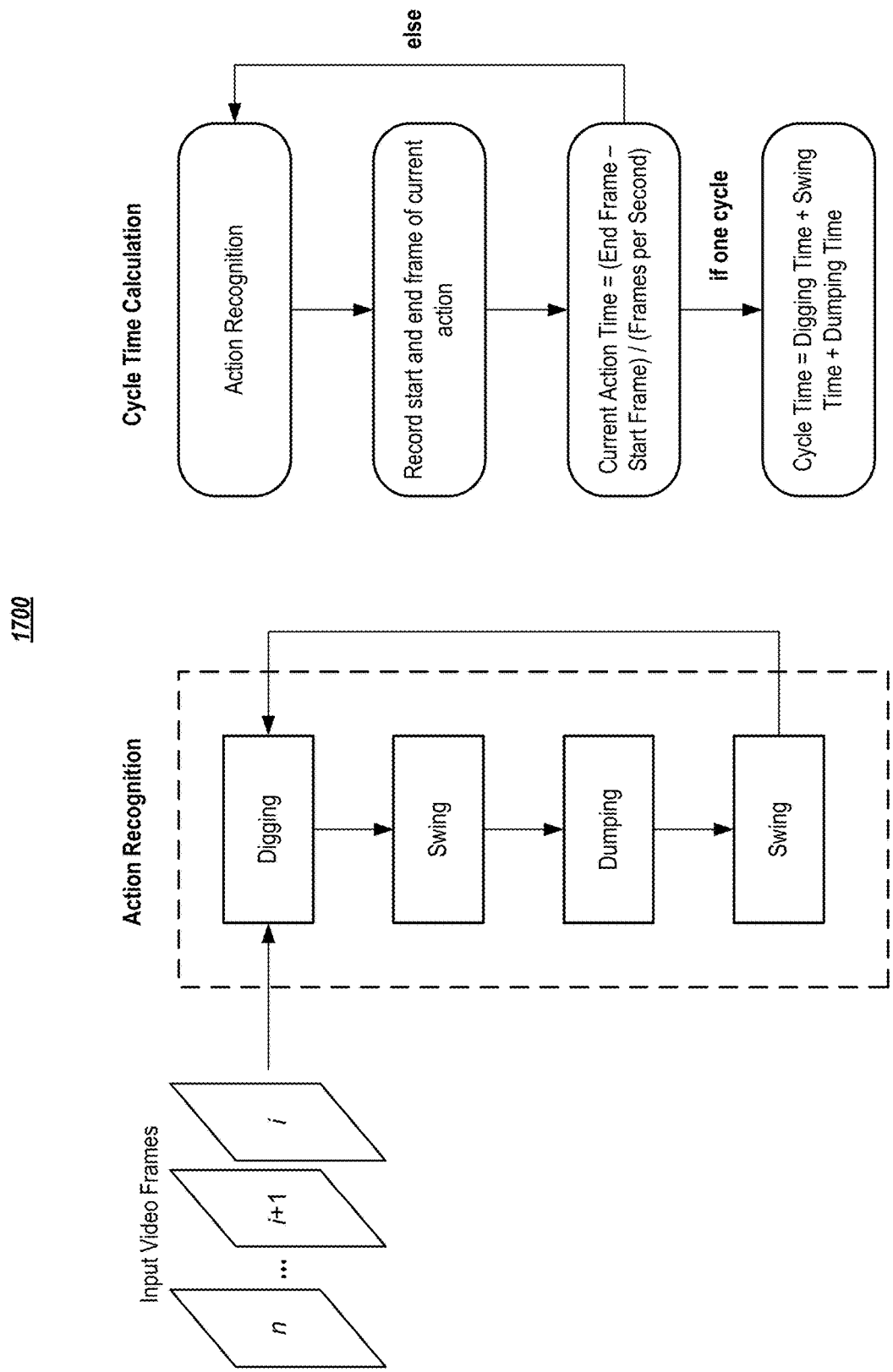
FIG. 17 depicts a workflow for determining cycle time, according to embodiments of the present disclosure.

The time for each cycle is measured following the workflow in FIG. 17. In one or more embodiments, the action recognition module labels each video frame of the excavator with an action label. The action labels of two consecutive frames may be compared. If they are the same, it means that the action remains same. Thus, the cumulative time for the current action is increased by 1/FPS (frame per second). If the labels are different, it means that a new action has started, and if the labels are different, it means that a new activity has started. The time of the newly recognized activity will increase by 1/FPS. In one or more embodiments, the total time of one cycle may be defined as the difference between the start times of two neighboring digging actions.

Figure 18:
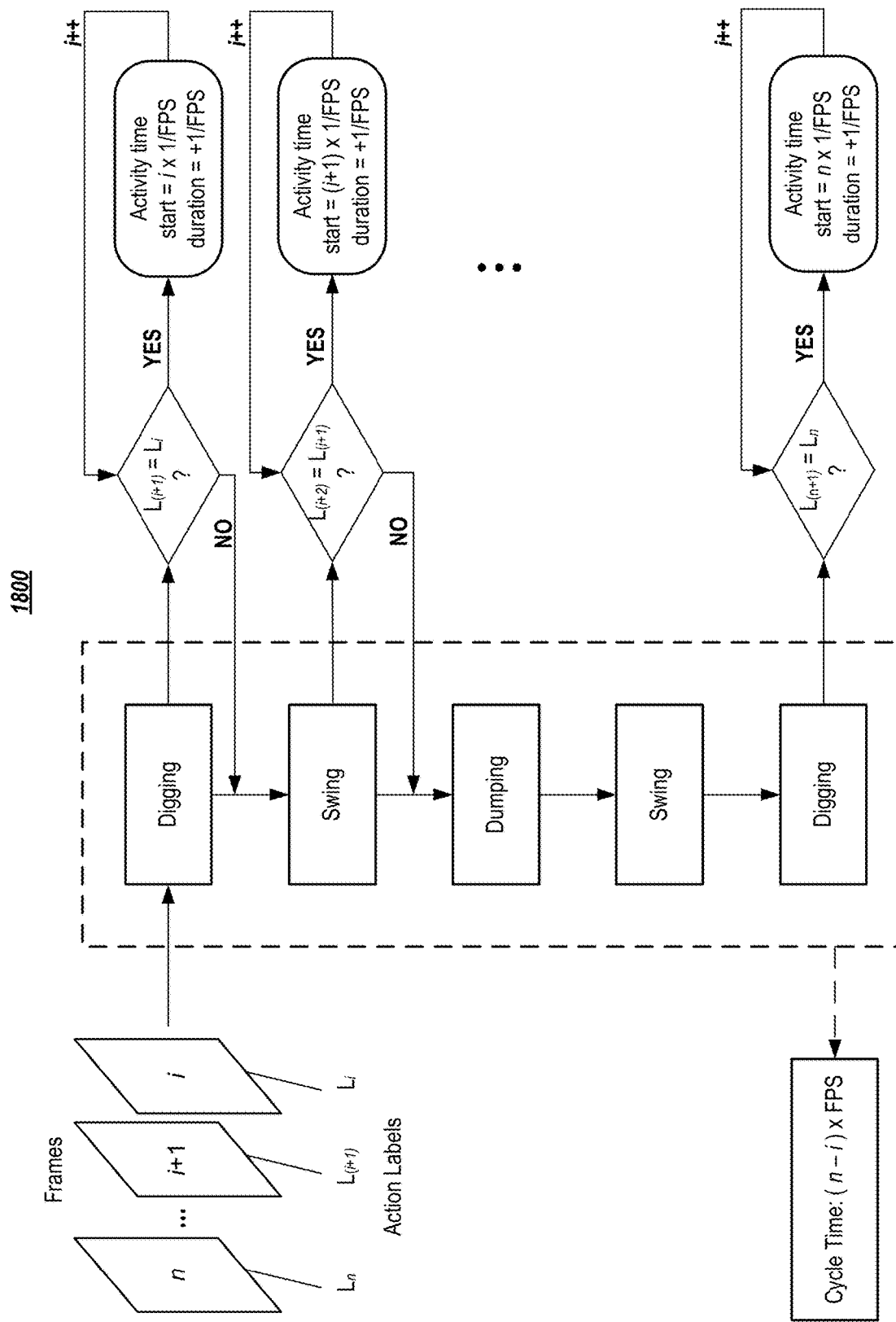
FIG. 18 depicts an alternative workflow for determining cycle time, according to embodiments of the present disclosure

FIG. 18 depicts an alternative workflow for determining cycle time, according to embodiments of the present disclosure. While not depicted in FIG. 18, if the last decision is "no," the flow may be the same as the first "no" decision flow.

D. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Dataset

An excavator dataset was collected from an Autonomous Excavator System (AES) from the waste disposal recycle scene (Liangjun Zhang, Jinxin Zhao, Pinxin Long, Liyang Wang, Lingfeng Qian, Feixiang Lu, Xibin Song, and Dinesh Manocha. An autonomous excavator system for material loading tasks. *Science Robotics*, 6(55), 2021, which is incorporated by reference herein in its entirety). The dataset including 10 hours of videos containing 9 classes of objects (excavators, loaders, human, truck, crane, cone, hook, car, shovel) in 5 data scenes (AES-line1, AES-line2, bird eye view construction sites, crane construction site, cones dataset). The dataset has 6692 images with object detection bounding boxes, 601 images with excavator poses, and background segmentation.

80% of the images were used for model training while 20% were for model validation and testing. 102 clips of excavator videos were labelled with 3 actions (digging, dumping, or swinging). The videos were captured at 1920× 1080 and filmed at 25 frames per second.

Embodiments were also tested based on a benchmark construction dataset, which included ~480 action videos of interacting pairs of excavators and dump trucks performing earth-moving operations, accompanied with annotations for object detection, object tracking, and actions. The videos were captured at 480×720 and filmed at 25 frames per second.

2. Evaluation a) Object Detection Evaluation

The detection evaluation metrics are based on an object detection, segmentation, and key-point detection dataset. The network's performance was evaluated using Average Precision (AP). Precision measures how many of the predictions that the model made were correct, and recall measures how well the model finds all the positives. For a specific value of Intersection over Union (IoU), the AP measures the precision/recall curve at recall values (r1, r2, etc.) when the maximum precision value drops. The AP may then be computed as the area under the curve by numerical integration. The mean average precision is the average of AP in each object class. More precisely, AP may be defined as:

$$AP = \frac{1}{11} \sum_{r \in (0.0, 0.1 \ldots, 1)} AP_r, \quad (2)$$

b) Pose Estimation Evaluation

An embodiment of a pose estimation evaluation matrix was based on the dataset defining the object keypoint similarity (OKS) and used the mean average precision (AP) as the main competition metric. The OKS was calculated from the distance between predicted points and ground truth points of the object.

c) Action Recognition Evaluation

In one or more embodiments, a performance metric that was used was the mean Average Precision (mAP) over each object class, using a frame-level IoU threshold of 0.5.

3. Accuracy a) Accuracy of the Detection Model

Experiments were implemented on the Faster R-CNN model with a backbone network of Resnet-50-FPN and Resnet-152-FPN. The tested model embodiment achieved high detection accuracy for construction equipment. The Average Precision (AP) values of the excavator achieved 93.0% and the loader achieved 85.2%. With an mAP of 90.1%, the model embodiment was demonstrated to be promising for detecting multi-class construction equipment accurately on the construction site.

Figure 19:
FIG. 19 depicts an example excavator and loader detection result, according to embodiments of the present disclosure.

The results were also compared with a YOLOv3 embodiment. YOLOv3 is a one-stage state-of-art detector with extremely fast speed. In this study, the image input size was 416×416 and this method processed 20 images in one second. Compared with some two-stage detectors, the performance of YOLOv3 was slightly low, but the speed was much faster and that can be important for real-time applications. The construction detection dataset from the previous step was used for training YOLOv3, which took 12 hours for the training process. The mAP of YOLOv3 on the testing set was 73.2% from an overall view, where the AP was 80.2% in the excavator category and 60.2% in the loader category. A result is depicted in FIG. 19, which shows that a tested embodiment is capable of detecting multi-class machines in real-time.

Figure 20A:
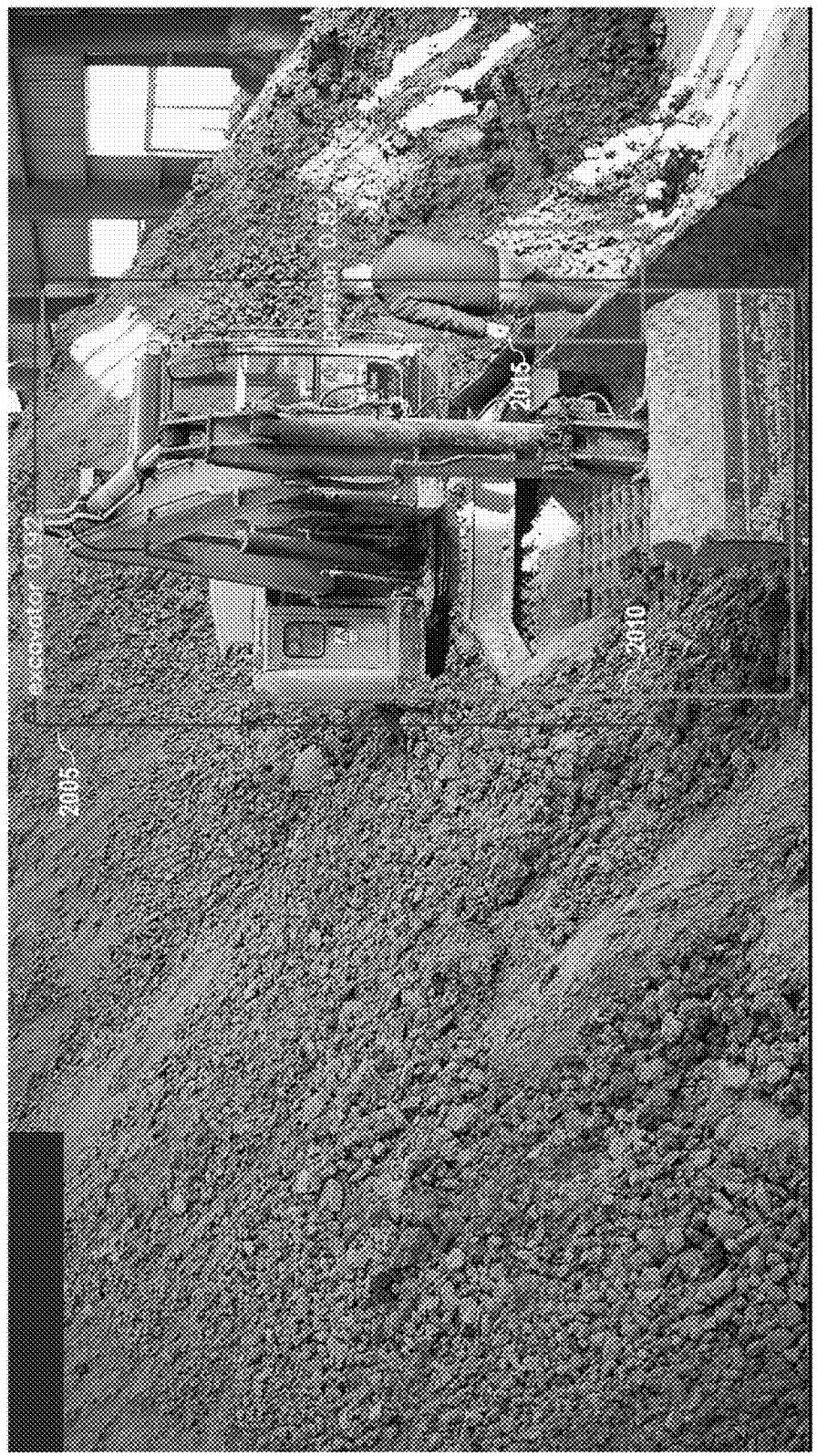
FIGS. 20A and 20B depict detection result comparison, according to embodiments of the present disclosure.
Figure 20B:

To further improve model speed and detection accuracy (especially on human), experiments on YOLO v5 model (small/medium/x-large) embodiments were performed. The model is able detect general construction site. The results showed the YOLO v5 model embodiment improved inference speed by 8 times (YOLO v5x-large) to 34 times (YOLO v5 small) compared with Faster R-CNN/YOLO v3 model embodiments. Furthermore, the accuracy of YOLO v5 model embodiments were improved by 0.7% to 2.7% (YOLO v5 medium and x-large) while model size was reduced by 3 (YOLO v5 x-large) to 30 (YOLO v5 small) times. The results showed the YOLO v5 multi-class objects detection model embodiment improved inference speed by 8 times (YOLO v5 x-large) to 34 times (YOLO v5 small) compared with Faster R-CNN/YOLO v3 model embodiments. Furthermore, the accuracy of YOLO v5 model embodiments were improved by 2.7% (YOLO v5 x-large) while model size was reduced by 63.9% (YOLO v5 x-large) to 93.9% (YOLO v5 small). The detailed comparison result is shown in Table 1, below. Some YOLO v5 embodiment results are shown in FIGS. 19A20A and 19B20B. FIG. 19A20A is from AES-line1 while FIG. 19B20B from AES-line2. The perception system embodiment was fine-tuned on YOLOv5 pretrained model embodiment ( 2010 and 2015) was capable of detecting hard-to-observe human compared to a Faster-RCNN model embodiment (2005), which missed the human (2015) in both scenarios.

TABLE 1

Accuracy of construction machine detection

| Network | Backbone(scale) | mAP(%) | Inf. time (ms/frame) | Model Size (MB) |
| --- | --- | --- | --- | --- |
| Faster R-CNN | Resnet-50-FPN | 90.1 | 588 | 482 |
| Faster R-CNN | Resnet-101-FPN | 92.3 | 588 | 482 |
| YOLOv3 | DarkNet-53 (320) | 78.0 | 313 | 492 |
| YOLOv3 | DarkNet-53 (608) | 75.7 | 344 | 492 |
| YOLOv5s | CSP-Darknet53 (640) | 88.9 | 9 | 14.9 |
| YOLOv5m | CSP-Darknet53 (640) | 93.0 | 14 | 42.9 |
| YOLOv5x | CSP-Darknet53 (640) | 95.0 | 39 | 174.2 | b) Accuracy of the Pose Estimation

Figure 21:
FIG. 21 depicts an example excavator pose estimation result, according to embodiments of the present disclosure.

A SimpleBaseline (Xiao et al., cited above) was applied for a pose estimation model embodiment, and the following results were obtained. Experiments were conducted on different Backbone networks, including Resnet-50 and Resnet-152. Experiments on different image input sizes were also implemented. The detailed comparison results are shown in Table 2. An example excavator pose estimation result is shown in FIG. 21

TABLE 2

Accuracy of the pose estimation model embodiments.

| Network | Backbone | Input Size | AP (%) |
| --- | --- | --- | --- |
| SimpleBaseline | Resnet-50 | 256 × 192 | 91.79 |
| SimpleBaseline | Resnet-50 | 384 × 288 | 94.19 |
| SimpleBaseline | Resnet-152 | 384 × 288 | 96.50 | c) Accuracy of the Action Recognition

Slow-Fast implementations (Feichtenhofer et al., cited above) were applied to an action recognition model embodiment, and the following results were obtained. Experiments were conducted on the different networks including Slow-Fast-101 and SlowFast-152. Experiments on different clip lengths were also implemented. A detailed comparison result is shown in Table 3.

TABLE 3

Accuracy of the action recognition model embodiments on the AES dataset and another dataset (Dataset 2).

| Dataset | Network | Backbone | Top1 Acc. (%) |
|---|---|---|---|
| AES | SlowFast-50 | ResNet3d | 89.70 |
|  | SlowFast-152 | ResNet3d | 91.44 |
| Dataset 2 | Roberts | N/A | 86.8 |
|  | SlowFast-50 | ResNet3d | 91.9 |
|  | SlowFast-152 | ResNet3d | 93.3 |

Figure 22:
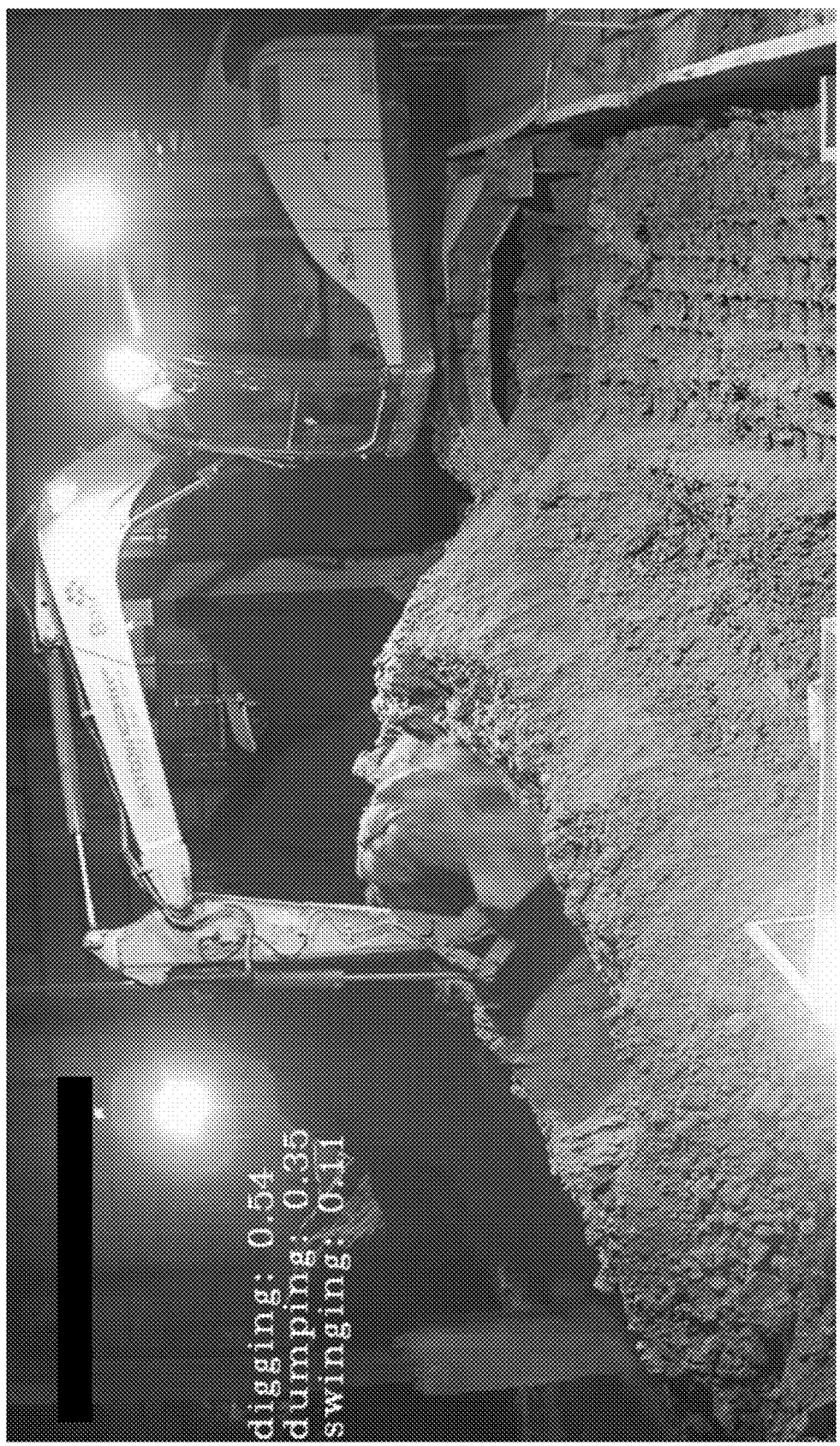
FIG. 22 depicts an example excavator long video action detection result, according to embodiments of the present disclosure.

The result of top 3 action prediction is showing in the FIG. 22. FIG. 22 depicts excavators long video action detection result, according to embodiments of the present disclosure. An excavator video was inputted into the tested system embodiment, and the tested system embodiment predicted action result in almost real-time. Prediction with the highest possibility is shown in the first line. Here the system embodiment predicted the action as digging with 54% confidence.

Figure 23:
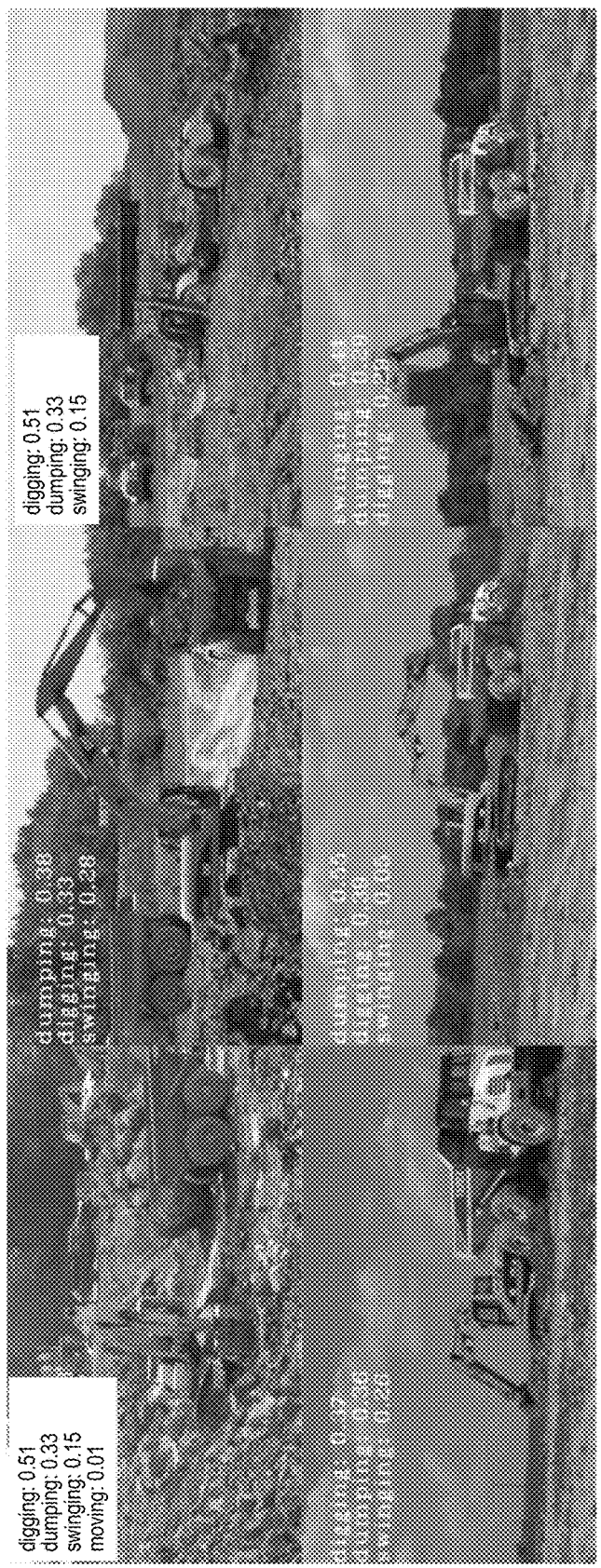
FIG. 23 depicts long video demonstrations of action recognition result on different scenes of construction, according to embodiments of the present disclosure.

Comparing result of the tested embodiment with Roberts (Dominic Roberts and Mani Golparvar-Fard. End-To-End Vision-Based Detection, Tracking and Activity Analysis of Earthmoving Equipment Filmed at Ground Level. Automation in Construction, 105:102811, 2019, which is incorporated by reference herein in its entirety) on their dataset, the tested action recognition embodiment outperformed their accuracy by about 5.18%. Some action recognition video results are shown in FIG. 23. The results show the advantage of using deep learning model on action recognition task over their Hidden Markov Model (HMM)+Gaussian Mixture Model (GMM)+Support Vector Machine (SVM) method.

4. Activity Analysis

An embodiment was tested to estimate the productivity of excavators on a long video sequence, which contained 15 minutes of excavator's operation. In the video, the XCMG 7.5-ton compact excavator (bucket volume of 0.4 $m^3$) completed 40 working cycles in 15 minutes. The average bucket full rate is 101% based on human measurement. Thus, the excavation productivity is 64.64 $m^3$/h according to Equation 1. The tested system embodiment detects 39 working cycles in the video, which the accuracy of productivity calculation is 97.5%. The test results showed the feasibility of using the pipeline embodiments to analyze real construction projects and to monitor the operation of excavators.

5. Additional Implementation Details and Hardware

The detection module embodiment was implemented based on YOLOv5 by ultralytics, MMDetection, segmentation module based on MMSegmentation, pose estimation module based on MMPose, and action recognition module based on MMAction2 toolbox. NVIDIA M40 24 GB GPUs were used to train the network embodiments. Testing was performed on local NVIDIA 1080 GPU. Then, an optimized embodiment was implemented on remote solid waste scene computer with Intel 9700 CPU (16 GB) and NVIDIA 1660 GPU (16 GB).

6. Training and Inference Time

It took 2, 3, and 4 hours to train YOLOv5 small, medium, and extra-large model embodiments for detection respectively, and it took 6 hours to train the pose estimation and action recognition subsystem modules. The inference time on Nvidia m40 machine for YOLOv5 small detection network can achieve as fast as 9 milliseconds (ms)/frame, medium as fast as 14 ms/frame, while extra-large can achieve as fast as 39 ms/frame as shown in Table 1, above.

In one or more embodiments, the object detection module, pose estimation module, working area segmentation module, and action recognition module were trained separately using supervised learning.

E. Some Conclusions or Observations

In this patent document, safety monitoring pipeline embodiments, productivity system pipeline embodiments, and combined safety monitoring and productivity embodiments were presented. Embodiments were based on computer vision and comprised deep learning techniques. In one or more embodiments, detection, pose estimation, activity recognition modules were integrated into a system. Also, a benchmark dataset including multi-class of objects in different lighting conditions was collected from the Autonomous Excavator System (AES). Embodiments were evaluated on a general construction dataset and achieve state-of-the-art results.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 24:
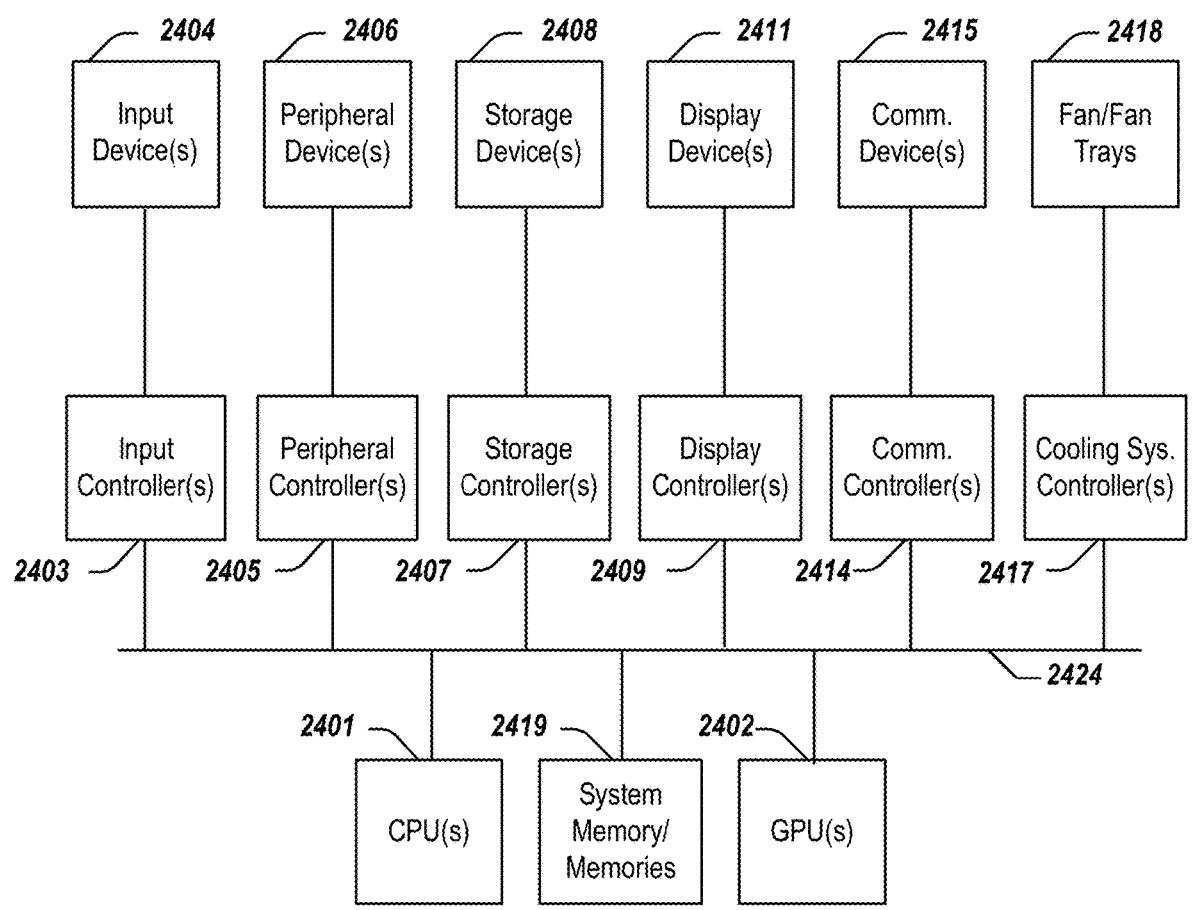
FIG. 24 depicts a simplified block diagram of a computing device/information handling system, according to embodiments of the present disclosure.

FIG. 24 depicts a simplified block diagram of an information handling system (or computing system), according to embodiments of the present disclosure. It will be understood that the functionalities shown for system 2400 may operate to support various embodiments of a computing system—although it shall be understood that a computing system may be differently configured and include different components, including having fewer or more components as depicted in FIG. 24.

As illustrated in FIG. 24, the computing system 2400 includes one or more CPUs 2401 that provides computing resources and controls the computer. CPU 2401 may be implemented with a microprocessor or the like, and may also include one or more graphics processing units (GPU) 2402 and/or a floating-point coprocessor for mathematical computations. In one or more embodiments, one or more GPUs 2402 may be incorporated within the display controller 2409, such as part of a graphics card or cards. The system 2400 may also include a system memory 2419, which may comprise RAM, ROM, or both.

A number of controllers and peripheral devices may also be provided, as shown in FIG. 24. An input controller 2403 represents an interface to various input device(s) 2404. The computing system 2400 may also include a storage controller 2407 for interfacing with one or more storage devices 2408 each of which includes a storage medium such as magnetic tape or disk, or an optical medium that might be used to record programs of instructions for operating systems, utilities, and applications, which may include embodiments of programs that implement various aspects of the present disclosure. Storage device(s) 2408 may also be used to store processed data or data to be processed in accordance with the disclosure. The system 2400 may also include a display controller 2409 for providing an interface to a display device 2411, which may be a cathode ray tube (CRT) display, a thin film transistor (TFT) display, organic light-emitting diode, electroluminescent panel, plasma panel, or any other type of display. The computing system 2400 may also include one or more peripheral controllers or interfaces 2405 for one or more peripherals 2406. Examples of peripherals may include one or more printers, scanners, input devices, output devices, sensors, and the like. A communications controller 2414 may interface with one or more communication devices 2415, which enables the system 2400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2400 comprises one or more fans or fan trays 2418 and a cooling subsystem controller or controllers 2417 that monitors thermal temperature(s) of the system 2400 (or components thereof) and operates the fans/fan trays 2418 to help regulate the temperature.

In the illustrated system, all major system components may connect to a bus 2416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for analyzing a working area, the system comprising:
   one or more cameras that capture images of the working area;
   one or more processors; and
   a non-transitory computer-readable medium or media comprising one or more sets of instructions which, when executed by at least one of the one or more processors, causes steps to be performed comprising:
    segmenting the working area into one or more defined sub-areas using a working area segmentation neural network subsystem that receives image data from at least one of the one or more cameras and segments the working area into the one or more defined sub-areas;
    detecting one or more objects in the working area using image data from at least one of the one or more cameras and an object detection neural network subsystem that receives the image data to produce, for each detected object from a set of one or more detected objects in the image data, a classification of the detected object and a bounding region data for the detected object; and
    using a safety monitor subsystem to detect a safety issue, in which the safety monitor subsystem:
        receives the one or more defined sub-areas of the working area from the working area segmentation neural network subsystem and, for each detected object from the set of one or more detected objects, its bounding region data from the object detection neural network subsystem;
        determines, based upon one or more models, the one or more defined sub-areas of the working area, and the bounding region data from the object detection neural network subsystem, whether a safety issue exists; and
        responsive to a safety issue existing, causes an alert to be made;
    wherein the safety monitor subsystem determines a safety issue by:
        using a bounding region data of a first detected object, a bounding region data of a second detected object, and at least one of the one or more defined sub-areas to monitor for safety by determining if a first threshold portion of the bounding region data of the first detected object and a second threshold portion of the bounding region data of the second detected object are within a same defined sub-area.

2. The system of claim 1 wherein at least one of the detected objects is equipment and the non-transitory computer-readable medium or media further comprises one or more sets of instructions which, when executed by at least one of the one or more processors, causes steps to be performed comprising:
    for the detected equipment, identifying a set of one or more action states of the equipment using an action recognition subsystem that, based upon image data from at least one of the one or more cameras, uses one or more models to identify the set of one or more action states of the equipment during a duration of the image data.

3. The system of claim 2 wherein the safety monitor subsystem is further configured to receive the set of one or more action states and uses one or more models to detect a safety issue by detecting a non-normal action state or a non-normal sequence of action states.

4. The system of claim 2 wherein the non-transitory computer-readable medium or media further comprises one or more sets of instructions which, when executed by at least one of the one or more processors, causes steps to be performed comprising:
    using the bounding region data of the detected equipment and the image data to generate a set of cropped images of the detected equipment; and
    inputting the set of cropped images of the detected equipment into an action neural network model that identifies one or more action states of the detected equipment across the set of cropped images.

5. The system of claim 2 wherein at least one of the one or more models of the action recognition subsystem comprises:
    a set of rules that identifies one or more action states of the detected equipment using a set of keypoints of the detected equipment across a set of images from the image data, in which the set of keypoints are obtained from a pose estimation subsystem that uses the bounding region data of the detected equipment and the image data from the object detection neural network subsystem to identify keypoints of the detected equipment across the set of images.

6. The system of claim 1 wherein the non-transitory computer-readable medium or media further comprises one or more sets of instructions which, when executed by at least one of the one or more processors, causes steps to be performed:
    for a detected object from the one or more detected objects, identifying a set of one or more action states of the detected object using an action recognition subsystem that, based upon image data from at least one of the one or more cameras, uses one or more models to identify the set of one or more action states of the detected object during a duration of the image data; and
    using a productivity analysis subsystem that receives, for the detected object, the one or more of the action states from the action recognition subsystem and determines productivity for the detected object based upon a set of parameters comprising one or more object-related parameters.

7. The system of claim 1 wherein the safety monitor subsystem further determines a safety issue by performing at least one of the steps comprising:
    using the bounding region data of the first detected object and the bounding region data of the second detected object to monitor for safety by determining if the bounding region data of the first detected object is within a threshold of the bounding region data of the second detected object; or
    using the bounding region data of the first detected object and at least one of the one or more defined sub-areas to monitor for safety by determining if a threshold portion of the bounding region data of the first detected object is within one of the defined sub-areas.

8. The system of claim 1 wherein the non-transitory computer-readable medium or media further comprises one or more sets of instructions which, when executed by at least one of the one or more processors, causes steps to be performed:
    for a detected object from the one or more detected objects, refining the bounding region data using a set of keypoints for the detected object, in which the set of keypoints for the detected object is obtained from a pose estimation subsystem that uses the bounding region data of the detected object and image data from the object detection neural network subsystem to identify the set of keypoints.

9. The system of claim 1 wherein the non-transitory computer-readable medium or media further comprises one or more sets of instructions which, when executed by at least one of the one or more processors, causes steps to be performed:
  for a detected object from the one or more detected objects:
    obtaining a set of keypoints for the detected object from a pose estimation neural network subsystem that uses the bounding region data of the detected object and image data from the object detection neural network subsystem to identify the set of keypoints; and
    using at least some of the set of keypoints for the detected object to determine a safety issue responsive to detecting a non-normal keypoint orientation.

10. A computer-implemented method for analyzing a working area, the method comprising:
  segmenting the working area into one or more defined sub-areas using a working area segmentation neural network subsystem that receives image data from at least one camera and segments the working area into the one or more defined sub-areas;
  detecting one or more objects in the working area using image data from the at least one camera and an object detection neural network subsystem that receives the image data to produce, for each detected object from a set of one or more detected objects in the image data, a classification of the detected object and a bounding region data for the detected object; and
  using a safety monitor subsystem to detect a safety issue, in which the safety monitor subsystem:
    receives the one or more defined sub-areas of the working area from the working area segmentation neural network subsystem and, for each detected object from the set of one or more detected objects, its bounding region data from the object detection neural network subsystem;
    determines, based upon one or more models, the one or more defined sub-areas of the working area, and the bounding region data from the object detection neural network subsystem, whether a safety issue exists; and
    responsive to a safety issue existing, causes an alert to be made;
  wherein the safety monitor subsystem determines a safety issue by:
    using a bounding region data of a first detected object, a bounding region data of a second detected object, and at least one of the one or more defined sub-areas to monitor for safety by determining if a first threshold portion of the bounding region data of the first detected object and a second threshold portion of the bounding region data of the second detected object are within a same defined sub-area.

11. The computer-implemented method of claim 10 further comprises:
  for a detected object from the set of one or more detected objects, defining a set of one or more action states of the detected object using an action recognition subsystem that, based upon image data from the at least one camera, uses one or more models to define the set of one or more action states of the detected object during a duration of the image data.

12. The computer-implemented method of claim 11 wherein:
  the action recognition subsystem obtains the set of one or more action states of the detected object by performing steps comprising:
    using the bounding region data of the detected object and the image data to generate a set of cropped images of the detected object; and
    inputting the set of cropped images of the detected object into an action neural network model that identifies the set of one or more action states of the detected object across the set of cropped images; and
  the computer-implemented method further comprises:
    using at least one or more of the action states to detect a safety issue responsive to detecting a non-normal action state or a non-normal sequence of action states.

13. The computer-implemented method of claim 11 wherein at least one of the one or more models of the action recognition subsystem comprises:
  a set of rules that identifies one or more action states of the detected object using a set of keypoints of the detected object across a set of images from the image data, in which the set of keypoints are obtained from a pose estimation subsystem that uses the bounding region data of the detected object, and the image data from the object detection neural network subsystem to identify keypoints of the detected object across the set of images.

14. The computer-implemented method of claim 10 wherein the safety monitor subsystem further determines a safety issue by performing at least one of the steps comprising:
  using the bounding region data of the first detected object and the bounding region data of the second detected object to monitor for safety by determining if the bounding region data of the first detected object is within a threshold of the bounding region data of the second detected object; or
  using the bounding region data of the first detected object and at least one of the one or more defined sub-areas to monitor for safety by determining if a threshold portion of the bounding region data of the first detected object is within one of the defined sub-areas.

15. The computer-implemented method of claim 10 wherein the step of producing a bounding region data for the detected object further comprises:
  for a detected object from the one or more detected objects, refining an initial bounding region data of the detected object to obtain the bounding region data by performing steps comprising:
    obtaining a set of keypoints for the detected object using a pose estimation subsystem that uses the initial bounding region data of the detected object and image data from the object detection neural network subsystem to identify the set of keypoints of the detected object; and
    using the set of keypoints for the detected object and the pose estimation subsystem to determine a pose for the detected object; and
    using the pose to refine the initial bounding region data for the detected object.

16. The computer-implemented method of claim 10 further comprising:
  for a detected object from the one or more detected objects:
    obtaining a set of keypoints for the detected object from a pose estimation neural network subsystem that uses the bounding region data of the detected object and image data from the object detection neural network subsystem to identify the set of keypoints; and using at least some of the set of keypoints for the detected object to determine a safety issue responsive to detecting a non-normal keypoint orientation.

17. A system for analyzing a working area, the system comprising:
one or more processors;
a non-transitory computer-readable medium or media comprising one or more sets of instructions which, when executed by at least one of the one or more processors, causes steps to be performed comprising:
segmenting the working area into one or more defined sub-areas using a working area segmentation neural network subsystem that receives image data from at least one camera and segments the working area into the one or more defined sub-areas;
detecting one or more objects in the working area using image data from the at least one camera and an object detection neural network subsystem that receives the image data to produce, for each detected object from a set of one or more detected objects in the image data, a classification of the detected object and a bounding region data for the detected object; and
using a safety monitor subsystem to detect a safety issue, in which the safety monitor subsystem:
receives the one or more defined sub-areas of the working area from the working area segmentation neural network subsystem and, for each detected object from the set of one or more detected objects, its bounding region data from the object detection neural network subsystem;
determines, based upon one or more models, the one or more defined sub-areas of the working area, and the bounding region data from the object detection neural network subsystem, whether a safety issue exists; and
responsive to a safety issue existing, causes an alert to be made;
wherein the safety monitor subsystem determines a safety issue by:
using a bounding region data of a first detected object, a bounding region data of a second detected object, and at least one of the one or more defined sub-areas to monitor for safety by determining if a first threshold portion of the bounding region data of the first detected object and a second threshold portion of the bounding region data of the second detected object are within a same defined sub-area.

18. The system of claim 17 wherein the non-transitory computer-readable medium or media further comprises one or more sets of instructions which, when executed by at least one of the one or more processors, causes steps to be performed comprising:
for a detected object from the set of one or more detected objects, defining a set of one or more action states of the detected object using an action recognition subsystem that, based upon image data from the at least one camera, uses one or more models to define the set of one or more action states of the detected object during a duration of the image data.

19. The system of claim 18 wherein:
the action recognition subsystem obtains the set of one or more action states of the detected object using either a rules-based model, a neural network-based model, or both; and
the non-transitory computer-readable medium or media further comprises one or more sets of instructions which, when executed by at least one of the one or more processors, causes steps to be performed comprising:
using at least one or more of the action states to detect a safety issue responsive to detecting a non-normal action state or a non-normal sequence of action states.

20. The system of claim 17 wherein the safety monitor subsystem further determines a safety issue by performing at least one of the steps comprising:
using the bounding region data of the first detected object and the bounding region data of the second detected object to monitor for safety by determining if the bounding region data of the first detected object is within a threshold of the bounding region data of the second detected object; or
using the bounding region data of the first detected object and at least one of the one or more defined sub-areas to monitor for safety by determining if a threshold portion of the bounding region data of the first detected object is within one of the defined sub-areas.

* * * * *